(12) United States Patent
Johnson

(10) Patent No.: US 11,280,614 B2
(45) Date of Patent: Mar. 22, 2022

(54) SYSTEM AND METHOD OF BALE COLLECTION

(71) Applicant: AGCO Corporation, Duluth, GA (US)

(72) Inventor: Gerald R. Johnson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 141 days.

(21) Appl. No.: 16/488,894

(22) PCT Filed: Jan. 19, 2018

(86) PCT No.: PCT/IB2018/000027
§ 371 (c)(1),
(2) Date: Aug. 26, 2019

(87) PCT Pub. No.: WO2018/158629
PCT Pub. Date: Sep. 7, 2018

(65) Prior Publication Data
US 2020/0033125 A1    Jan. 30, 2020

Related U.S. Application Data

(60) Provisional application No. 62/466,052, filed on Mar. 2, 2017.

(51) Int. Cl.
*G01C 21/00* (2006.01)
*A01B 69/04* (2006.01)
*A01D 87/12* (2006.01)

(52) U.S. Cl.
CPC ............ *G01C 21/00* (2013.01); *A01B 69/008* (2013.01); *A01D 87/122* (2013.01)

(58) Field of Classification Search
None
See application file for complete search history.

(56) References Cited

U.S. PATENT DOCUMENTS 8,407,157 B2 *   3/2013   Anderson ............ G06Q 10/047
                                                                705/500
2015/0354961 A1 * 12/2015 Reinecke ............ A01B 69/008
                                                                701/25

FOREIGN PATENT DOCUMENTS

EP       3 141 108 A1    3/2017
WO    2014/122364 A1    8/2014

OTHER PUBLICATIONS

European Patent Office, International Search Report for related International Application No. PCT/IB2018/000027, dated Apr. 12, 2018.

* cited by examiner

*Primary Examiner* — Truc M Do

(57) ABSTRACT

A system comprises a mobile machine (14) for collecting a plurality of bales (10,12) dispersed across a ground surface and one or more computing devices. The one or more computing devices are configured to receive location and orientation information for the plurality of bales (10,12), the location and orientation information including a location and an orientation of each of the bales (10,12), automatically determine a preferred path for collecting the bales using the location and orientation information, and present information about the preferred path to an operator of the mobile machine (14).

11 Claims, 28 Drawing Sheets

| 196 | 198 | 200 |
|---|---|---|
| 1 | [Path Description] | 143 |
| 2 | [Path Description] | 167 |
| 3 | [Path Description] | 134 |
| 4 | [Path Description] | 147 |
| 5 | [Path Description] | 198 |
| 6 | [Path Description] | 203 |
| 7 | [Path Description] | 158 |
| 8 | [Path Description] | 176 |
| 9 | [Path Description] | 169 |
| 10 | [Path Description] | 181 |
| 11 | [Path Description] | 251 |
| 12 | [Path Description] | 194 |
| 13 | [Path Description] | 185 |
| 14 | [Path Description] | 228 |
| . | . | . |
| . | . | . |
| . | . | . |

| 202 | 204 | 206 | 208 | 210 | 212 |
|---|---|---|---|---|---|
| 1 | [Path A1 Identifier] | 193 | [Path B1 Identifier] | 177 | 370 |
| 2 | [Path A1 Identifier] | 193 | [Path B2 Identifier] | 186 | 379 |
| 3 | [Path A1 Identifier] | 193 | [Path B3 Identifier] | 264 | 457 |
| 4 | [Path A1 Identifier] | 193 | [Path B4 Identifier] | 215 | 408 |
| 5 | [Path A1 Identifier] | 193 | [Path B5 Identifier] | 199 | 392 |
| 6 | [Path A1 Identifier] | 193 | [Path B6 Identifier] | 264 | 457 |
| 7 | [Path A1 Identifier] | 193 | [Path B7 Identifier] | 195 | 388 |
| ... | ... | ... | ... | ... | ... |
| n | [Path A2 Identifier] | 207 | [Path B1 Identifier] | 177 | 384 |
| n+1 | [Path A2 Identifier] | 207 | [Path B2 Identifier] | 186 | 393 |
| n+2 | [Path A2 Identifier] | 207 | [Path B3 Identifier] | 264 | 471 |
| n+3 | [Path A2 Identifier] | 207 | [Path B4 Identifier] | 215 | 422 |
| n+4 | [Path A2 Identifier] | 207 | [Path B5 Identifier] | 199 | 406 |
| n+5 | [Path A2 Identifier] | 207 | [Path B6 Identifier] | 264 | 471 |
| ... | | | | | ... |

FIG. 42

SYSTEM AND METHOD OF BALE COLLECTION

FIELD

Embodiments of the present invention relate to systems and methods for collecting bales. More particularly, embodiments of the present invention relate to systems and methods for optimizing the collection of agricultural bales dispersed across a ground surface.

BACKGROUND

Hay and forage crops are typically harvested by cutting the crops, allowing the crops to lie on the ground to dry, and then baling the dried crop. The baling process involves using balers to collect the crop from the ground as the balers travel along the ground, form the crop into a bale, tie or wrap the bale to preserve the bale's shape and/or protect it from the elements, and then place the bale onto the ground. The bales may be placed on the ground as they are formed in the baler such that a plurality of bales are placed randomly in a field. To use or transport the bales, or to clear the field in which the bales were placed, the bales must be collected. Often, bales are removed from a field and placed in a stack at an edge of the field until they are used or transported to another location.

The above section provides background information related to the present disclosure which is not necessarily prior art.

SUMMARY

A system in accordance with a first embodiment of the invention comprises a mobile machine for collecting a plurality of bales dispersed across a ground surface, and one or more computing devices. The one or more computing devices are configured to receive location and orientation information for the plurality of bales, the location and orientation information including a location and an orientation of each of the bales. The one or more computing devices are further configured to automatically determine a preferred path for collecting the bales using the location and orientation information and present information about the preferred path to an operator of the mobile machine.

A system in accordance with another embodiment of the invention comprises a mobile machine for collecting bales dispersed across a ground surface, and one or more computing devices. The one or more computing devices are configured to receive location and orientation information for a plurality of bales dispersed across a ground surface of a field, the location and orientation information including a location and an orientation of each of the bales. The one or more computing devices are further configured to automatically determine a preferred path for collecting a number of the bales using the location and orientation information and a stacking location of the bales, the number of the bales being a subset of all of the plurality of bales, and present information about the preferred path to an operator of the mobile machine.

A system in accordance with another embodiment of the invention comprises a mobile machine for collecting a plurality of bales dispersed across a ground surface, and one or more computing devices. The one or more computing devices are configured to receive location and orientation information for the plurality of bales, the location and orientation information including a location and an orientation of each of the bales. The one or more computing devices are further configured to automatically determine a preferred path for collecting the bales using the location and orientation information and automatically guide the mobile machine along the preferred path.

A method in accordance with another embodiment of the invention comprises receiving, via one or more computing devices associated with a mobile machine for collecting a plurality of bales dispersed across a ground surface, location and orientation information for the plurality of bales, the location and orientation information including a location and an orientation of each of the bales. The method further comprises automatically determining a preferred path for collecting the bales using the location and orientation information and presenting information about the preferred path to an operator of the mobile machine.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

DRAWINGS

Embodiments of the present invention are described in detail below with reference to the attached drawing figures, wherein:

FIGS. 26-38 and 40-41 illustrate a plurality of bales in a field and various path segments that may be used to collect the bales according to the method depicted in FIG. 25.

FIGS. 39 and 42 illustrate path information stored in exemplary data tables.

Figure 1:
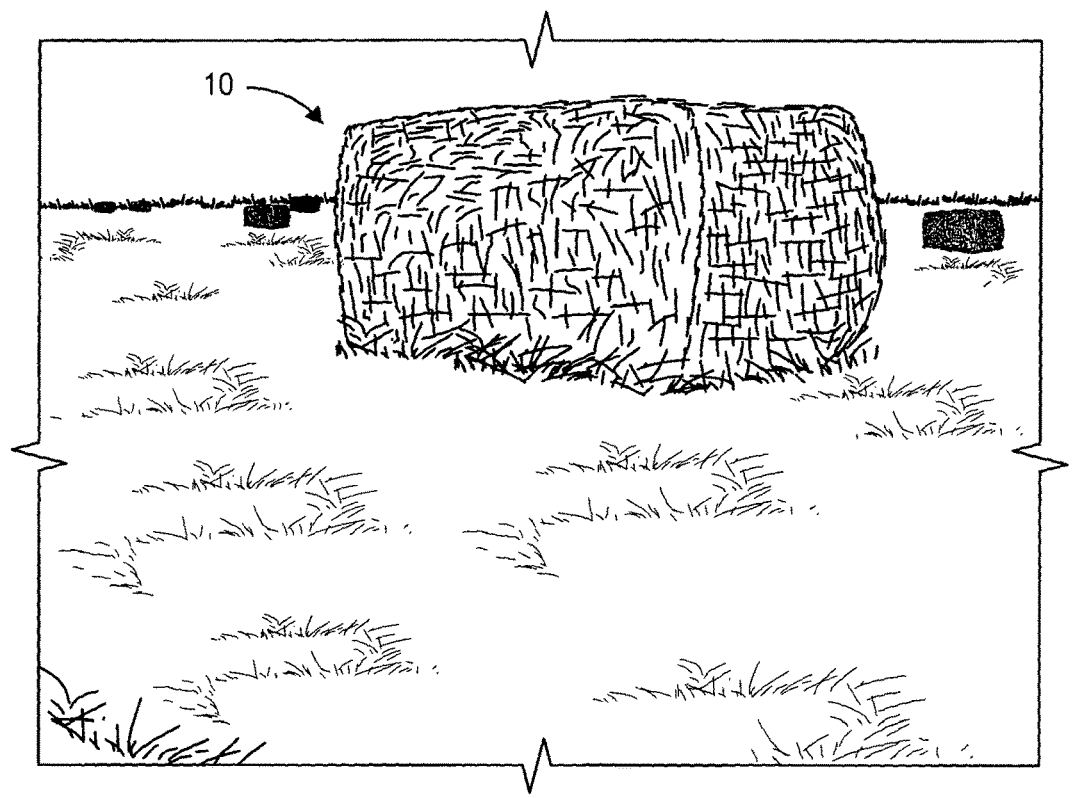
FIG. 1 is a perspective view of a plurality of rectangular bales of agricultural product placed on the ground surface of a field.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following description is, therefore, not to be taken in a limiting sense.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the present technology can include a variety of combinations and/or integrations of the embodiments described herein.

Figure 2:
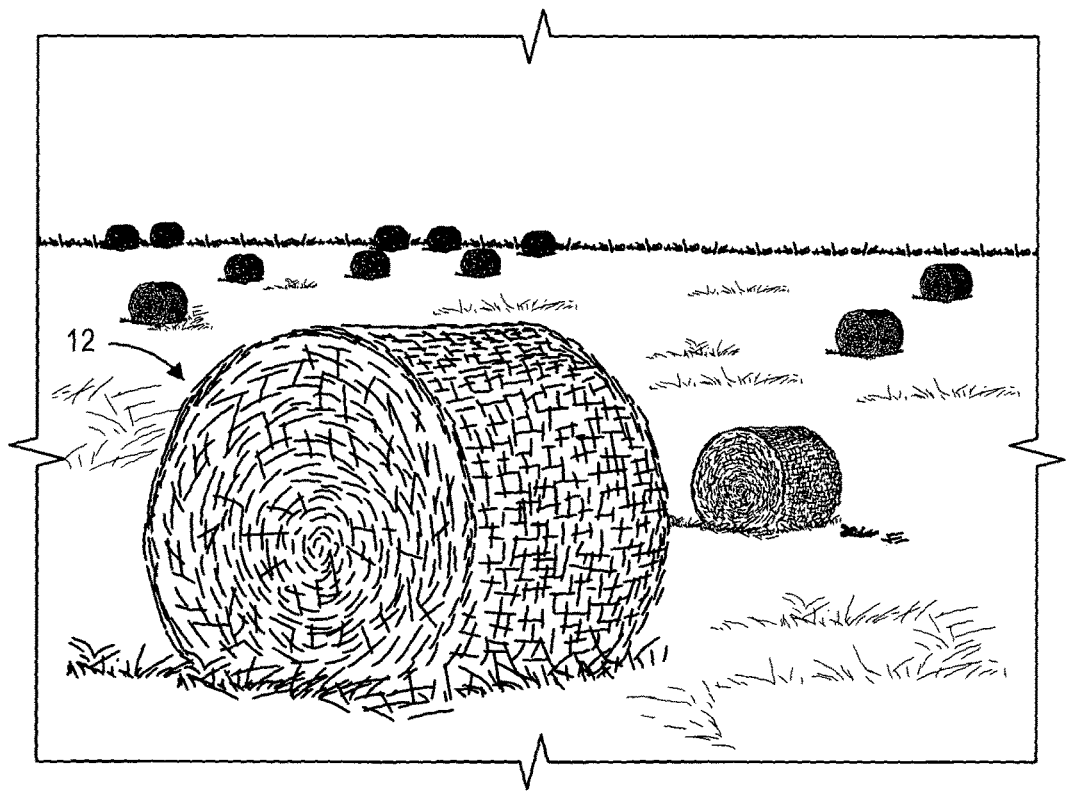
FIG. 2 is a perspective view of a plurality of round bales of agricultural product placed on the ground surface of a field.
Figure 3:
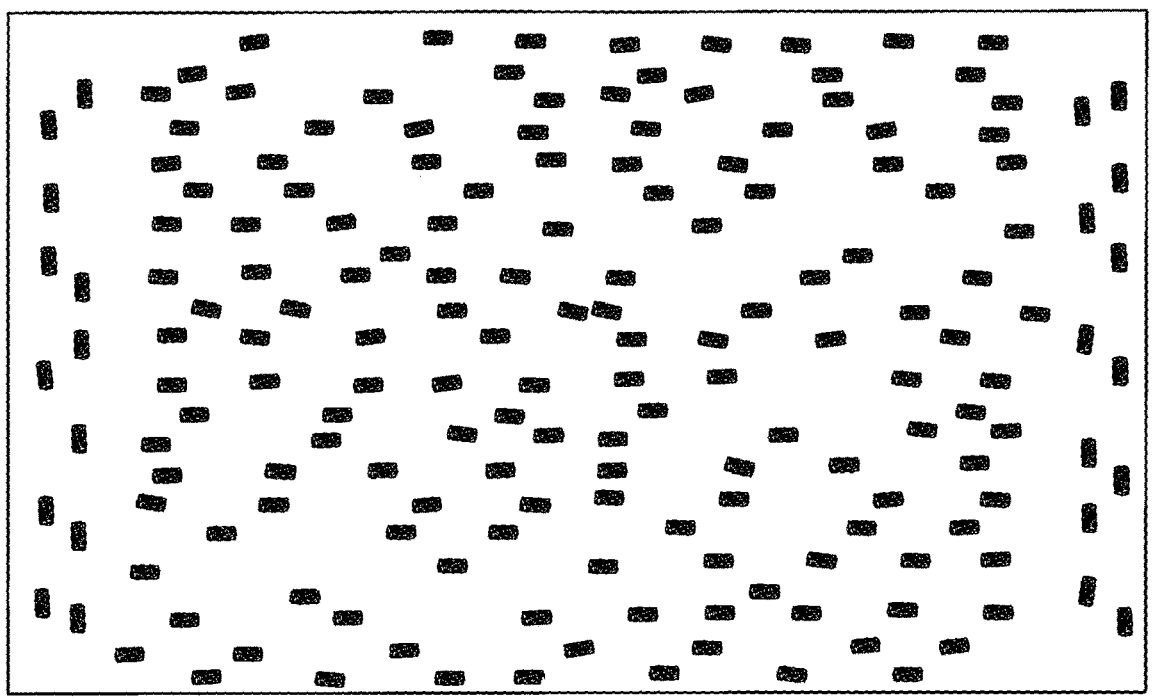
FIG. 3 is a plan view of a plurality of bales of agricultural product placed on the ground surface of a field.

Embodiments of the invention relate to systems and methods for collecting bales in a manner that optimizes the bale collection process. The bales may be agricultural bales, such as rectangular bales 10 of hay or straw as illustrated in FIG. 1 or round bales 12 of hay or straw as illustrated in FIG. 2, that are formed by a baling machine and placed at various locations in the field during a harvesting process. The harvesting process may result in a large number of bales scattered across a relatively large area, as illustrated in FIG. 3. There may be, for example, several hundred bales dispersed randomly across a field.

Figure 5:
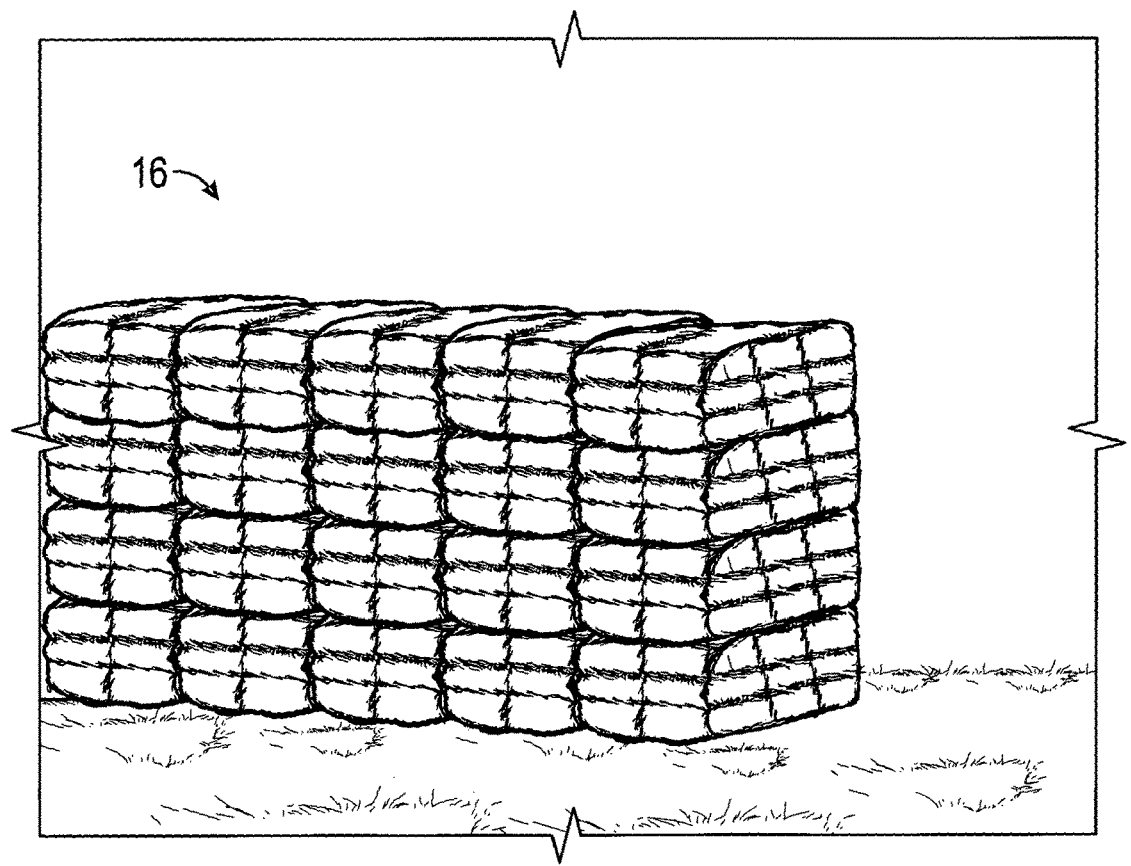
FIG. 5 illustrates a stack of rectangular bales.

After the baling process producers may collect the bales from the field and stack them in a single location in the field (or other location). A bale collection machine, such as the bale stacker 14 illustrated in FIG. 4, may be used to collect, transport and stack the bales. The bale stacker 14 is operable to pick bales up from a ground surface, carry a plurality of collected bales, and then place the collected bales in a stack at a desired stacking location. Multiple loads of bales may be placed in a single stacking location to create a single, large stack 16 as illustrated in FIG. 5. The bale stacker 14 is one example of a bale collection machine that may be used to implement embodiments of the present invention. Other examples of bale collection machines useful with the present invention may collect round bales, or may be pulled by a tractor rather than being self-propelled.

Figure 4:
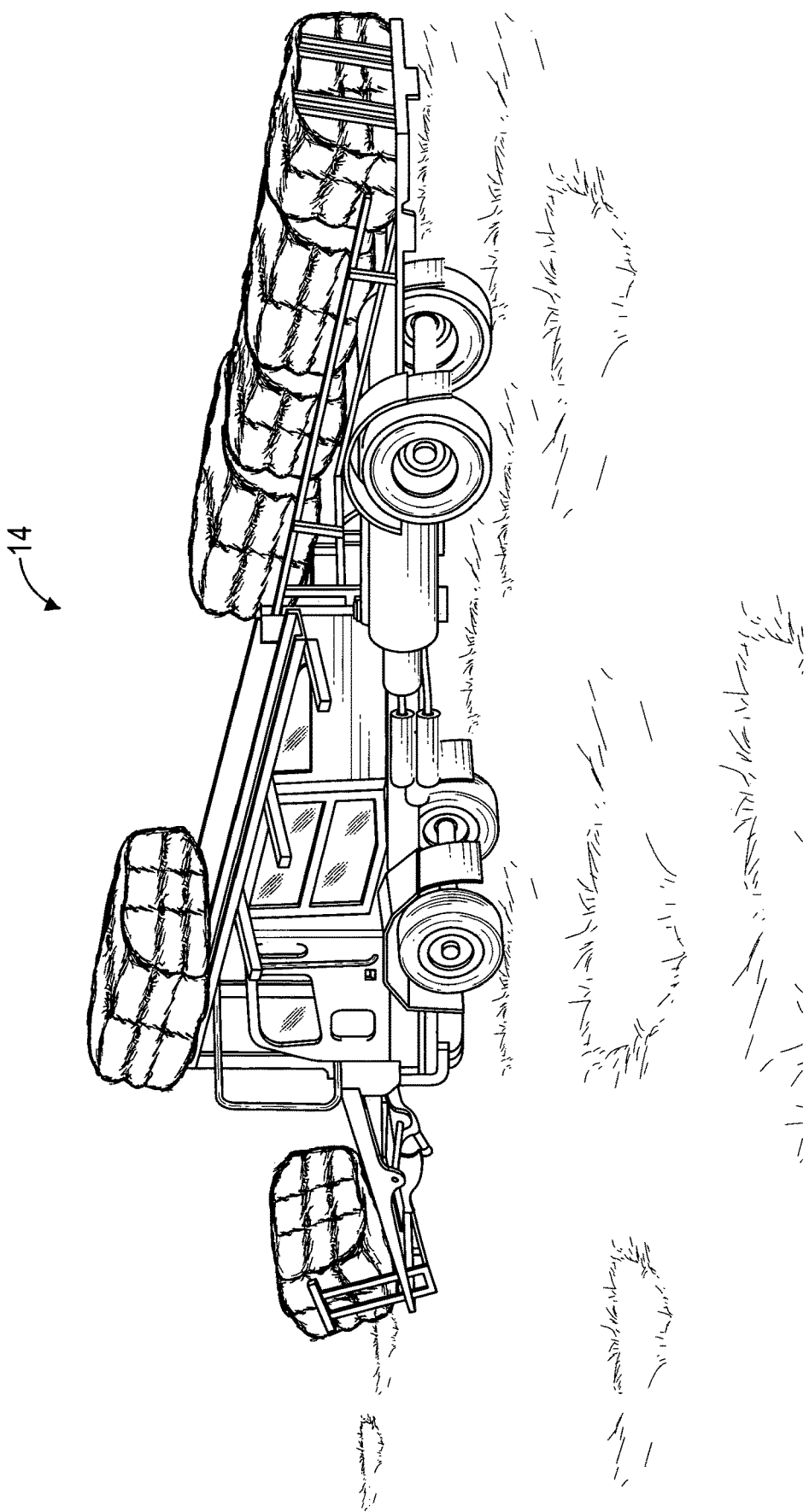
FIG. 4 illustrates a mobile machine for collecting and stacking rectangular bales.
Figure 6:
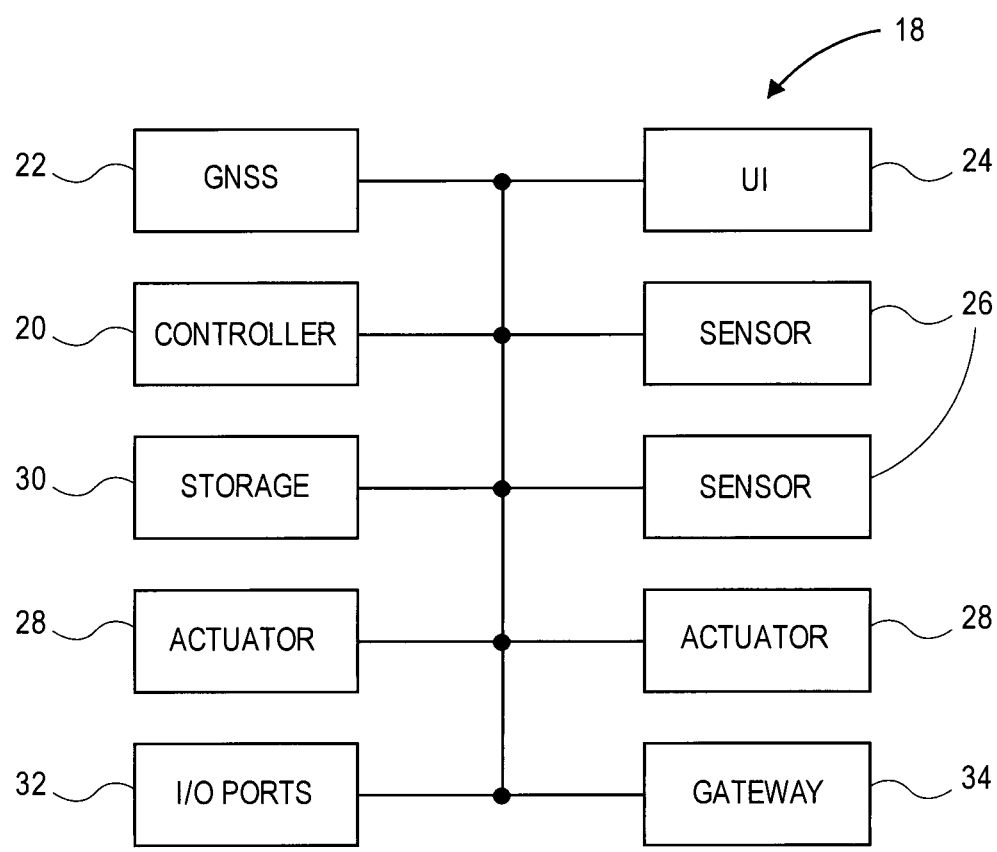
FIG. 6 is a block diagram of an exemplary communications and control system used in the machine of FIG. 4.

Certain aspects of the present invention may be implemented by or with the assistance of an electronic system, such as a control and communications system associated with the bale stacker 14 illustrated in FIG. 4 or other bale collection machine. Various components of an exemplary control and communication system 18 are illustrated in FIG. 6. The system 18 broadly includes a controller 20, a position determining device 22, a user interface 24, one or more sensors 26, one or more actuators 28, one or more storage components 30, one or more input/out ports 32 and a gateway 34.

The position determining device 22 may include a global navigation satellite system (GNSS) receiver, such as a device configured to receive signals from one or more positioning systems such as the United States' global positioning system (GPS), the European GALILEO system and/or the Russian GLONASS system, and to determine a location of the machine using the received signals. The user interface 24 includes components for receiving information, instructions or other input from a user and may include buttons, switches, dials, and microphones, as well as components for presenting information or data to users, such as displays, light-emitting diodes, audio speakers and so forth. The user interface 24 may include one or more touchscreen displays capable of presenting visual representations of information or data and receiving instructions or input from the user via a single display surface.

The sensors 26 may be associated with any of various components or functions of an associated machine including, for example, various elements of the engine, transmission(s), and hydraulic and electrical systems. One or more of the sensors 26 may be configured and placed to detect environmental or ambient conditions in, around or near a machine with which the system 18 is associated. Such environmental or ambient conditions may include temperature, humidity, wind speed and wind direction. The actuators 28 are configured and placed to drive certain functions of the machine including, for example, steering when an automated guidance function is engaged. The actuators 28 may take virtually any form but are generally configured to receive control signals or instructions from the controller 20 (or other component of the system) and to generate a mechanical movement or action in response to the control signals or instructions. By way of example, the sensors 26 and actuators 28 may be used in automated steering of a machine wherein the sensors 26 detect a current position or state of steered wheels or tracks and the actuators 28 drive steering action or operation of the wheels or tracks. In another example, the sensors 26 collect data relating to the operation of the machine and store the data in the storage component 30, communicate the data to a remote computing device via the gateway 34, or both.

The controller 20 includes one or more integrated circuits programmed or configured to implement the functions described herein. By way of example the controller 20 may be a digital controller and may include one or more general purpose microprocessors or microcontrollers, programmable logic devices, or application specific integrated circuits. The controller 20 may include multiple computing components placed in various different locations on the machine. The controller 20 may also include one or more discrete and/or analog circuit components operating in conjunction with the one or more integrated circuits or computing components. Furthermore, the controller 20 may include or have access to one or more memory elements operable to store executable instructions, data, or both. The storage component 30 stores data and preferably includes a non-volatile storage medium such as optic, magnetic or solid state technology.

It will be appreciated that, for simplicity, certain elements and components of the system 18 have been omitted from the present discussion and from the drawing of FIG. 6. A power source or power connector is also associated with the system, for example, but is conventional in nature and, therefore, is not discussed herein.

In some embodiments, all of the components of the system 18 are contained on or in a single host machine. The present invention is not so limited, however, and in other embodiments one or more of the components of the system 18 may be external to the machine. In one embodiment, for example, some of the components of the system 18 are contained on or in a host machine while other components of the system 18 are contained on or in an implement associated with the host machine. In that embodiment, the components associated with the machine and the components associated with the implement may communicate via wired or wireless communications according to a local area network such as, for example, a controller area network. The system 18 may be part of a communications and control system conforming to the ISO 11783 (also referred to as "ISOBUS") standard. In yet another embodiment, one or more components of the system 18 may be located remotely from the machine and any implements associated with the machine. In that embodiment, the system 18 may include wireless communications components (e.g., the gateway) for enabling the machine to communicate with a remote computer, computer network or system. It may be desirable, for example, to use one or more computing devices external to the machine to determine, or assist in determining, a preferred travel path for collecting a plurality of bales, as explained herein.

Figure 7:
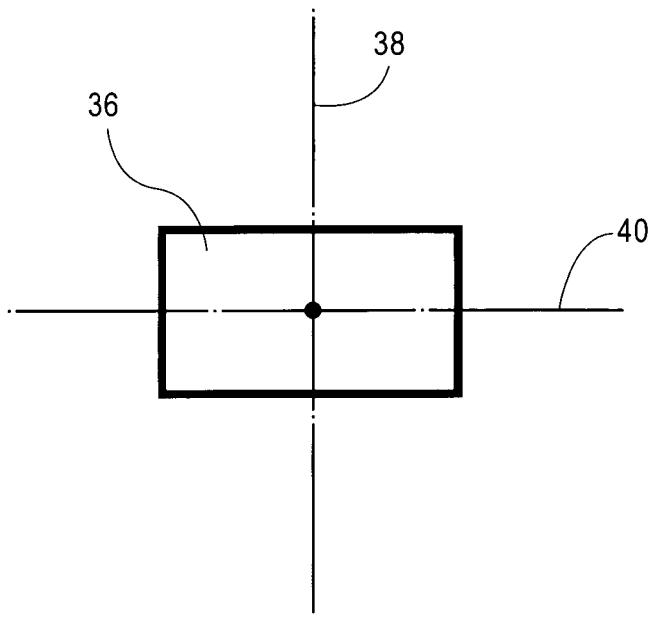
FIG. 7 is a diagram of a bale illustrating first and second axes of the bale.
Figure 8:
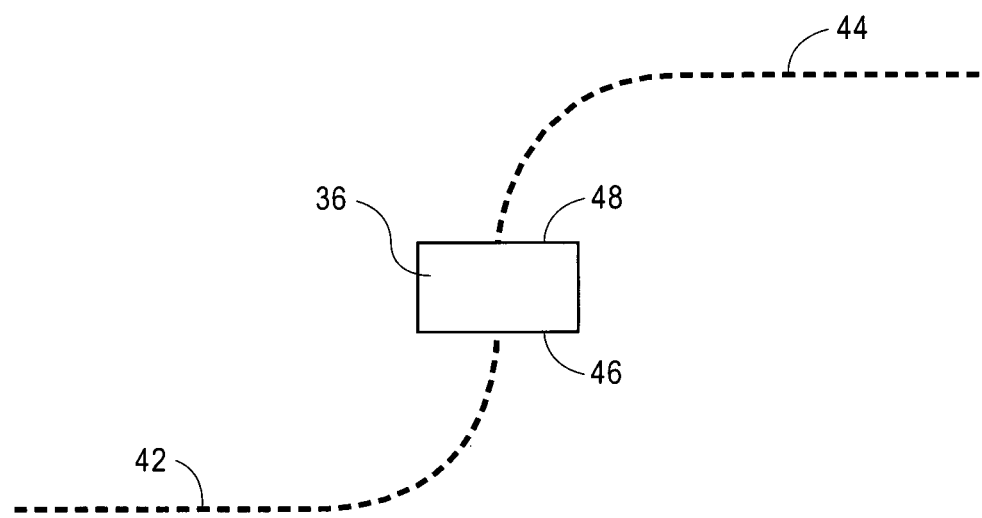
FIG. 8 illustrate an exemplary travel path a machine may follow when collecting the bale of FIG. 7.

Depending on the type of machine that is used to collect the bales, where the bales are positioned and the nature of the environment where the bales are to be collected, various collection constraints may limit how a bale collection machine operates to collect the bales and, therefore, may limit the paths the machine may follow to collect the bales. Examples of collection constraints include the orientation of the bale when it is collected, the minimum turning radius of the machine, the machine travel path profile, terrain surface characteristics, and travel boundaries. Bale orientation may be a constraint if the machine must engage the bale in line with a particular orientation. With reference to FIG. 7, a bale 36 presents a first axis 38 and a second axis 40. If the bale 36 is a rectangular bale, the machine may need to engage a broad side of the bale 36 when collecting the bale 36 or, in other words, engage the bale 36 while moving in a direction parallel with the first axis 38. If the bale 36 is a round bale, the machine may need to engage a flat face of the bale 36. With reference to FIG. 8, exemplary path segments 42, 44 illustrate a path a machine may follow when collecting the bale 36, wherein the machine either engages side 46 or side 48. Bale orientation may not be a collection constraint if, for example, the machine is configured to push a bale into the proper orientation before fully engaging it.

Figure 9:
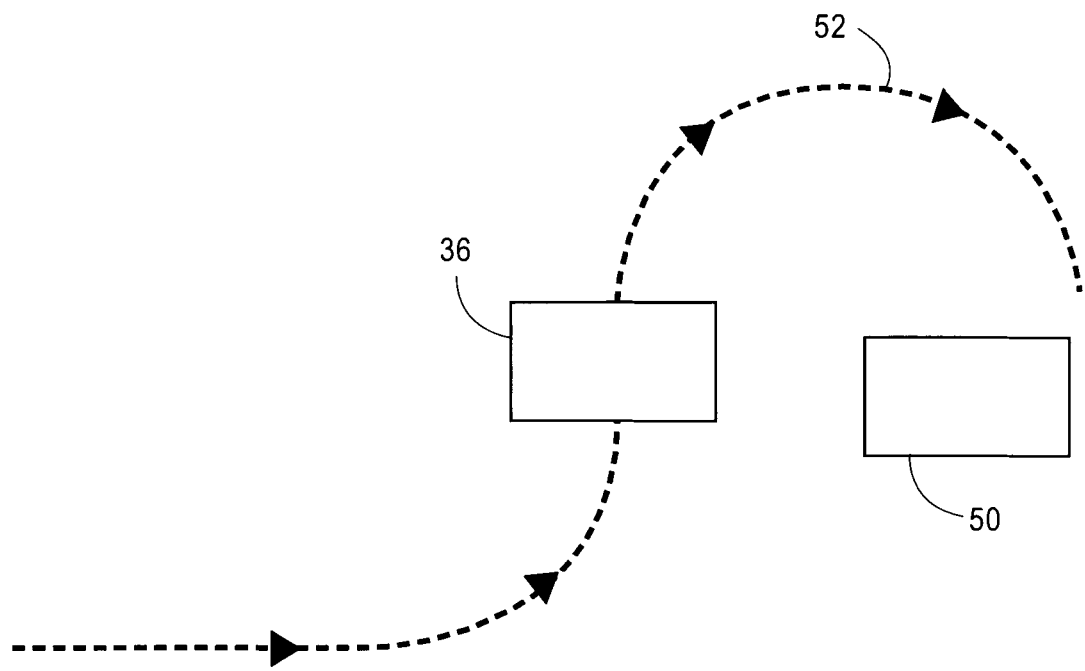
FIG. 9 illustrates a pair of bales and a bale collection machine's travel path constrained by a minimum turning radius associated with the machine.

The minimum turning radius of a bale collection machine may also limit how the machine collects the bales. The curved portions of the path segments 42, 44 in FIG. 8 may represent the minimum turning radius of the machine. If a second bale 50 is located in close proximity to the first bale 36, as illustrated in FIG. 9, the minimum turning radius of the machine may render the shortest or most direct travel path segment between the first bale and the second bale impossible to use when collecting the bale. As illustrated in FIG. 9, after collecting the first bale 36 in the direction of the arrows the machine makes a sharp turn in an attempt to collect the second bale 50, but the machine's minimum turning radius causes the machine to overshoot the second bale. In that situation any travel path segment leading directly from the first bale 36 to the second bale 50 would have to be lengthened to allow the machine to make the turn and properly engage the second bale 50. Thus, if bale orientation is a collection constraint, the travel path segment 52 may need to be adjusted or lengthened to properly position the machine in line with the bale 50 at the necessary orientation.

Figure 10:
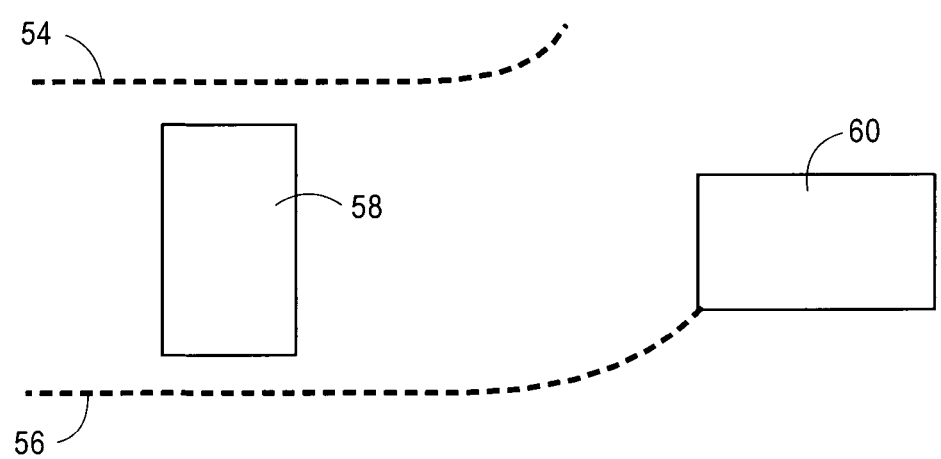
FIG. 10 illustrates a pair of bales and a bale collection machine's travel path constrained by a travel path profile associated with the machine.

The machine travel path profile includes the width of a bale collection machine's travel path that may come into contact with a bale, tree, fence or other obstacle as the machine travels through a field. The machine's travel path profile is at least as wide as the machine's wheels or tracks but may be even wider if portions of the machine extend forwardly, rearwardly and/or latterly beyond the wheels. An example of how a machine's travel path profile might limit how the machine collects bales is illustrated in FIG. 10. The dashed lines 54, 56 illustrate the area covered by the machine as the machine travels along the ground, such that any object located inside the lines 54, 56 would contact the machine. In this instance the machine's travel path profile is wider than the bale 58 collected by the machine, and may correspond to the width of the machine's wheels and/or other portions of the machine, as explained above. The machine collects a first bale 58 but cannot collect a second bale 60, either because the second bale 60 is not in the proper orientation relative to the direction of travel of the machine or because the machine has reached its capacity. The machine operator may attempt to turn the machine to avoid the second bale 60 but at least a portion of the machine would collide with the second bale 60, as illustrated. Thus, when planning a bale collection path that avoids reversing the machine's direction (in other words, stopping and backing up the machine), this particular path segment would not be used. Alternatively, the second bale 60 may be collected before the first bale 58.

The travel path profile depends on such things as the footprint of a bale collection machine's wheels or tracks, the machine's turning radius and the overall size and shape of the machine. Thus, the travel path profile will typically be different for different machines and may be generated by the machine manufacturer for use by a computing device when determining a preferred bale collection path. If the machine includes a side arm or other laterally-extending component, for example, the travel path profile may be substantially wider than the width of one of the bales and may represent an even greater limitation on the travel path than what is illustrated in FIG. 10.

Terrain characteristics may also limit how a bale collection machine collects bales. By way of example, the machine may be more effective at engaging and collecting bales when travelling upward on a slope than when travelling downward on a slope. In that situation information about the terrain may be used to avoid creating a travel path segment that requires the machine to collect a bale on a downward slope (or other surface terrain) that is beyond the machine's capabilities or otherwise presents a problem. By way of example, if a bale is on a ground surface that slopes at a grade beyond a designated threshold, a bale collection path may be used that requires the machine to collect the bale while travelling uphill on the surface rather than downhill.

Figure 11:
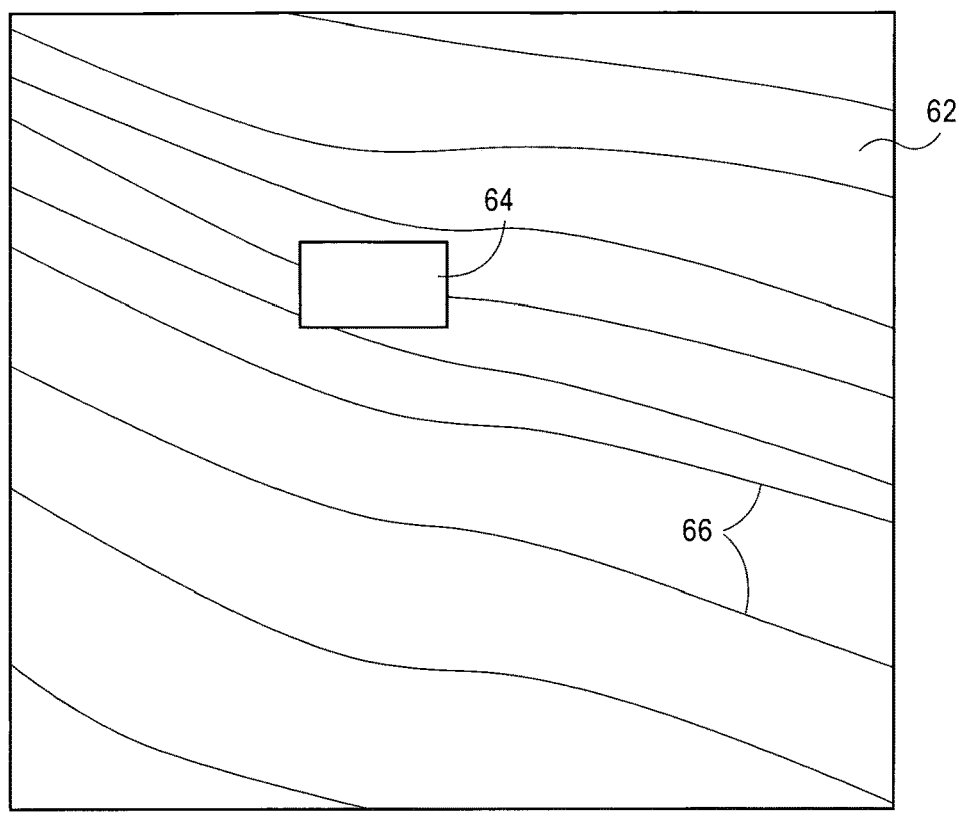
FIGS. 11-12 illustrate a bale on a ground surface defined by topographical indicators, and an exemplary travel path for collecting the bale.

A portion of a field 62 with a bale 64 and surface terrain characteristics is illustrated in FIG. 11, including contour lines 66 showing surface elevation changes. Each contour line 66 represents a surface elevation and lines closer to the bottom of the drawing represent lower elevations than lines closer to the top of the drawing, such that a machine travelling from a location near the top of the figure to a location near the bottom of the figure would be travelling downhill.

Figure 12:
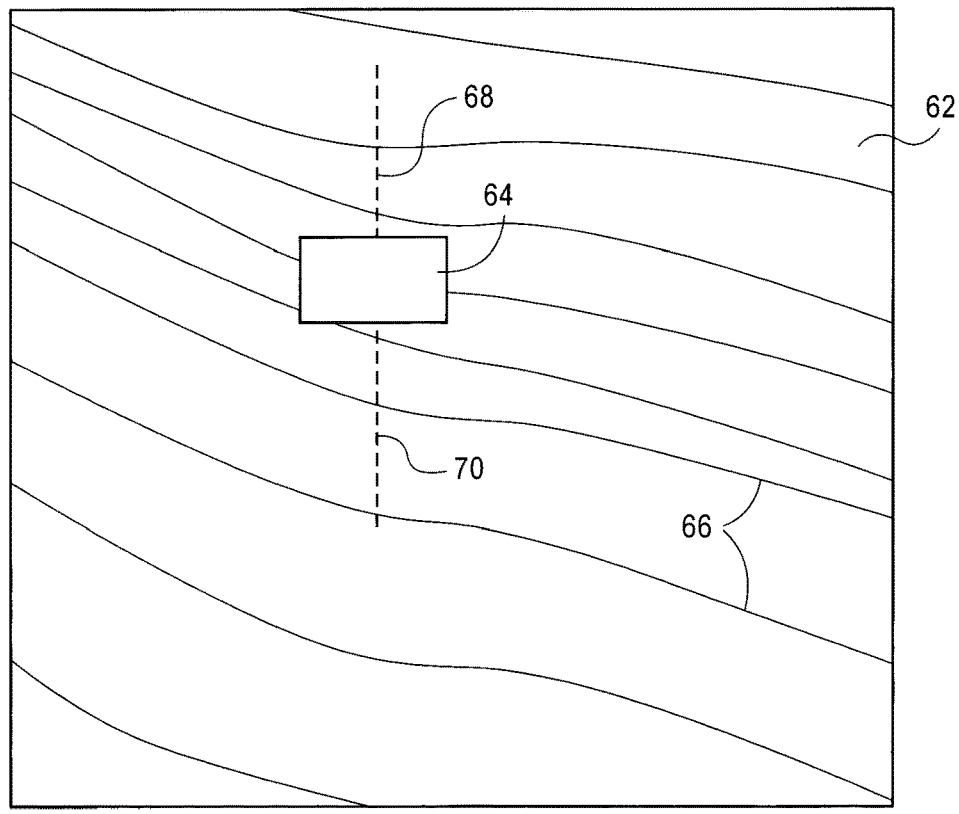

With reference to FIG. 12, if the machine engages the bale 64 from a first side 68 the machine will be travelling downhill, while if the machine engages the bale from a second side 70 the machine will be travelling uphill. If the machine is better suited for collecting bales along an uphill slope than along a downhill slope, any travel path segments that require the machine to collect the bale from the first side 68 may be avoided when planning a bale collection path. Terrain slope may only be an issue when it exceeds a predetermined threshold grade, such that a method of planning a bale collection path may involve determining whether the slope exceeds the predetermined threshold grade and, if so, avoiding any travel path segments that require the machine to collect the bale along an unfavorable slope. Surface terrain information for a field where bales are to be collected may be included in a file stored in computer memory or otherwise available to or communicated to a computing device used to determine a preferred bale collection path.

Figure 13:
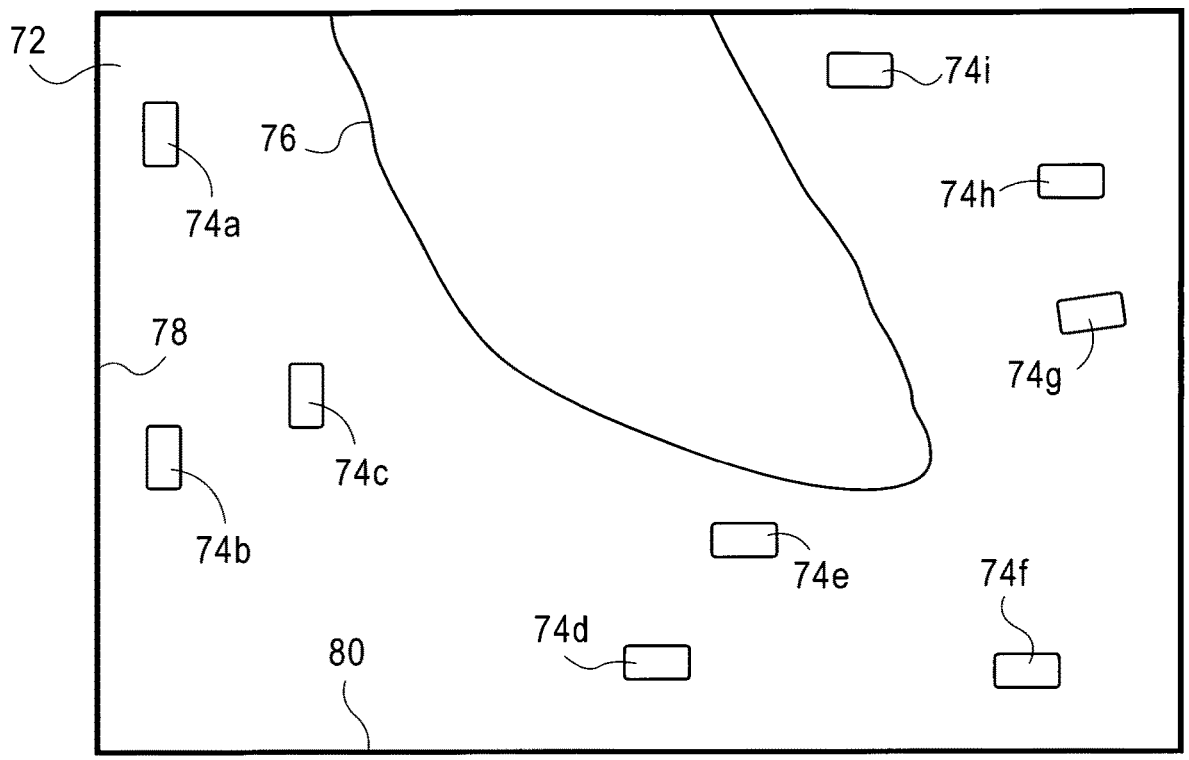
FIGS. 13-14 illustrate a field with a plurality of bales and various boundaries limiting the travel of a bale collection machine.

Machine travel boundaries may also be a bale collection constraint. A field 72 including a plurality of bales 74 and various travel boundaries is illustrated in FIG. 13. A first boundary defined by line 76 may outline an area including trees, a body of water, a ravine or other obstacle or field condition that is unsuitable for operation of the machine. Other boundaries defined by lines 78 and 80 may correspond to a fence, a road, a tree line and/or other physical boundary. Planning a bale collection path for the field 72 would be constrained in that none of the path segments would cross any of the boundary lines 76, 78, 80. Furthermore, and with reference to FIG. 14, one or more buffer zones 82 may be associated with the boundary lines 76, 78, 80. A method of determining a preferred bale collection path may involve avoiding placing any travel path segments within a buffer zone 82. Boundary lines and buffer zones may be predetermined and stored in a computer-usable storage system, or may be defined by a machine operator and submitted, for example, via the user interface 24.

FIGS. 15 through 19 illustrate examples of travel paths and path segments used by a bale collection machine to collect bales wherein the path definition is constrained by the requirement that the machine engage each bale according to a particular bale orientation. With initial reference to FIG. 15, an exemplary portion of a field is illustrated including a plurality of bales 84, a designated stacking location 86 for the collected bales and a current location 88 of the machine. In this example the bales 84 are rectangular bales and the machine collects each bale by engaging the bale at a front of the machine when the machine is travelling in a forward direction that is perpendicular (or nearly perpendicular) to a longitudinal axis of the bale. In other words, the machine must collect each bale by engaging the broad side of the bale rather than the narrow side. It will be appreciated, however, that the bales 84 may be round bales and the same principles may apply, wherein the machine collects each bale by engaging the bale when the machine is travelling in a direction that is perpendicular (or nearly perpendicular) to a flat face of the bale.

The machine collects a first bale 84a as it engages the bale 84a along a first path segment 90, wherein the machine picks up the bale 84a and proceeds to a second bale 84b. Because the machine must collect the bale 84b by engaging a broad side as described above, path segment 92 is not an option for travel from bale 84a to bale 84b, but a second possible path segment 94 is a viable option. Another path segment 96 may be an option, but is not selected as part of this travel path. The machine may follow the complete path illustrated in FIG. 16 to collect a full load of six bales, wherein the path comprises six path segments 90, 94, 98, 100, 102 and 104, and a return path segment 106 from the last bale to the bale stack location 86. As can be seen, the bale collection path of the machine intersects each of the bales 84 in line with the required orientation. An unused travel path segment 108 would have resulted in a shorter overall bale collection path, but would not have allowed the machine to engage the bale 84f at the proper orientation and therefore could not have been used as part of the collection path. If bale orientation were not a constraint, that path segment 108 may have been used.

Figure 15:
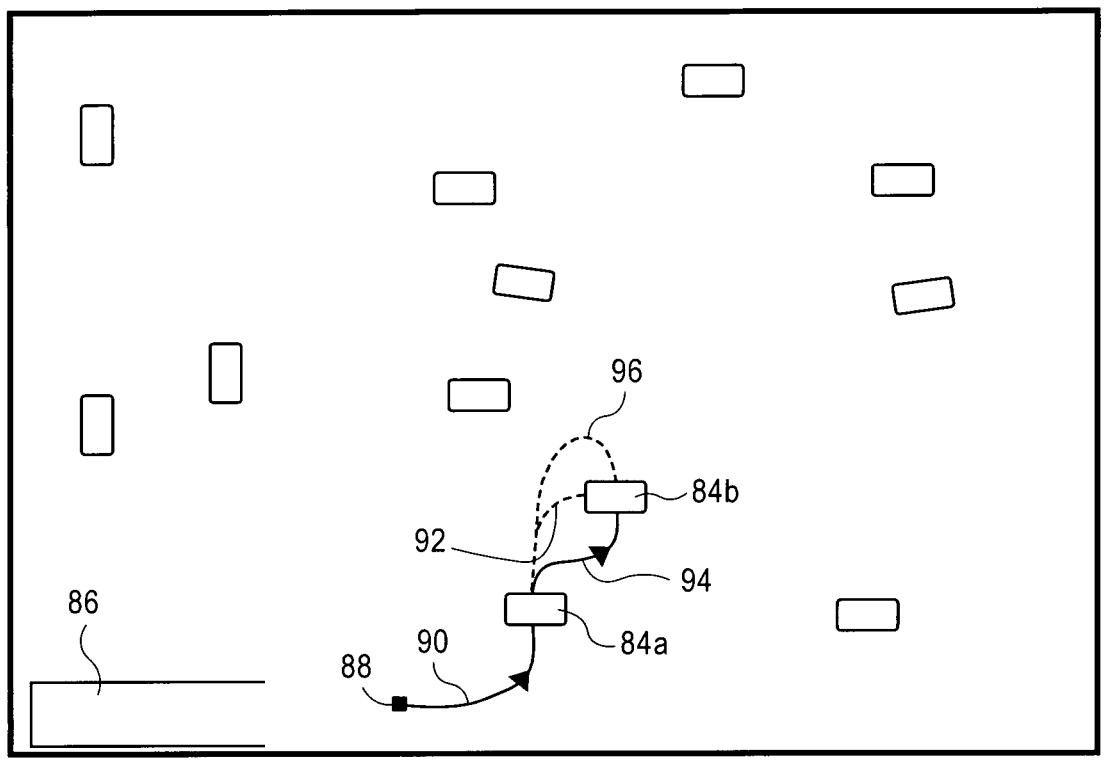
FIGS. 15-24 illustrate path segments for collecting bales.
Figure 16:
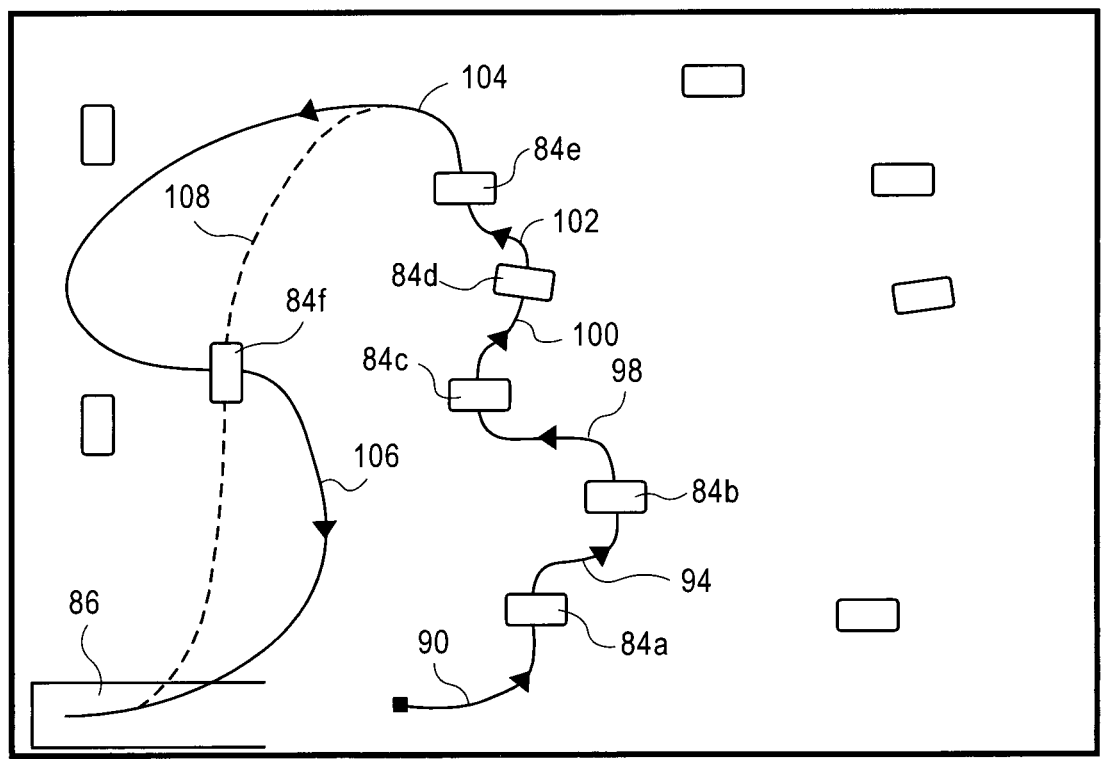
Figure 17:
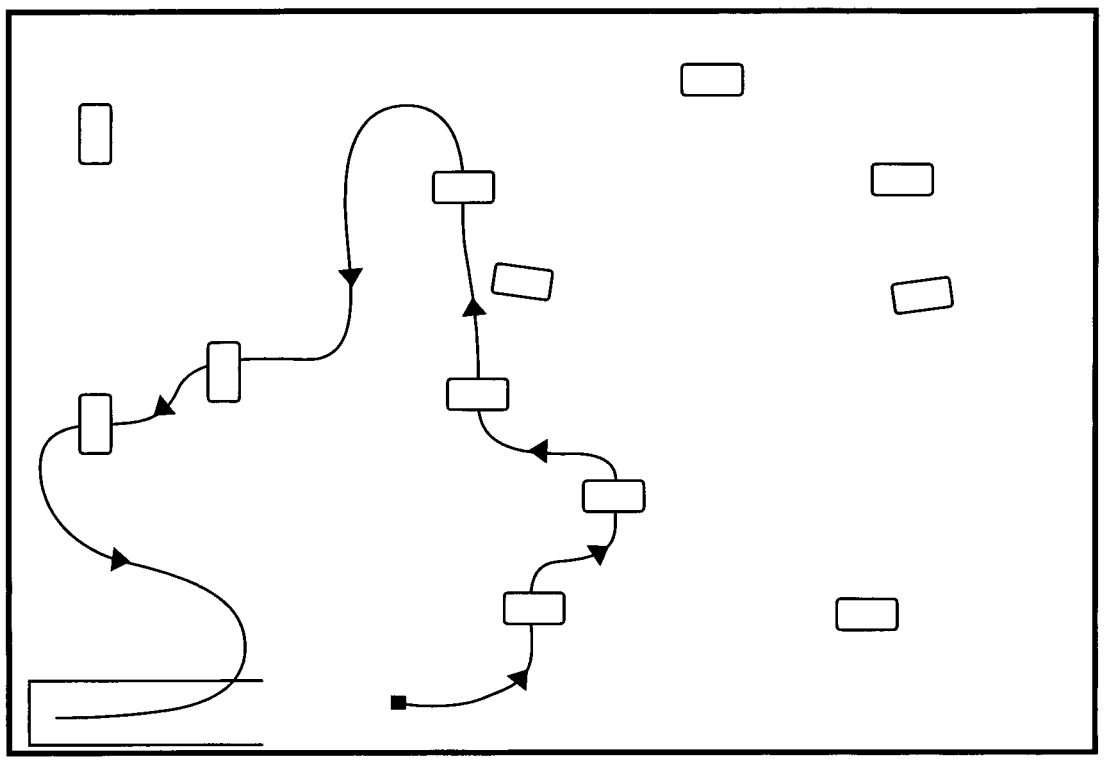
Figure 18:
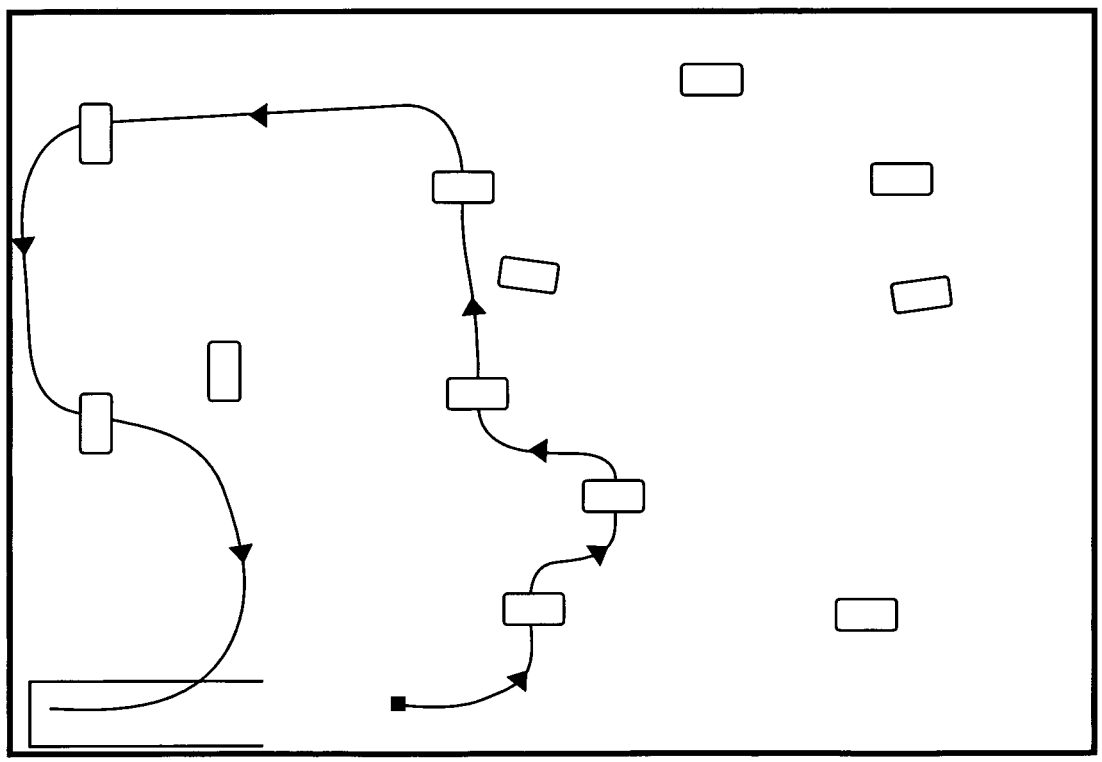
Figure 19:
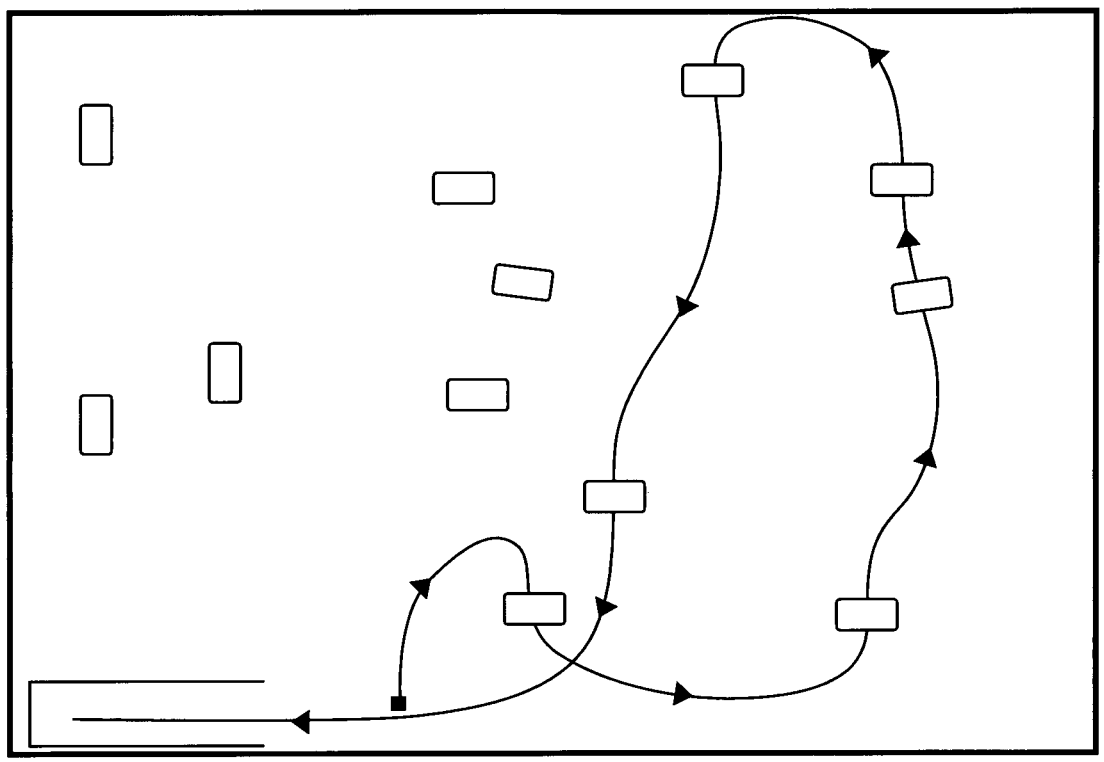

FIGS. 17-19 each illustrate a different possible travel path for collecting six bales from the same plurality of bales illustrated in FIG. 15, wherein each travel path is different than the others but conforms to the same constraint as the path illustrated in FIG. 15, namely, the machine must engage each bale according to the particular orientation as described above.

Figure 20:
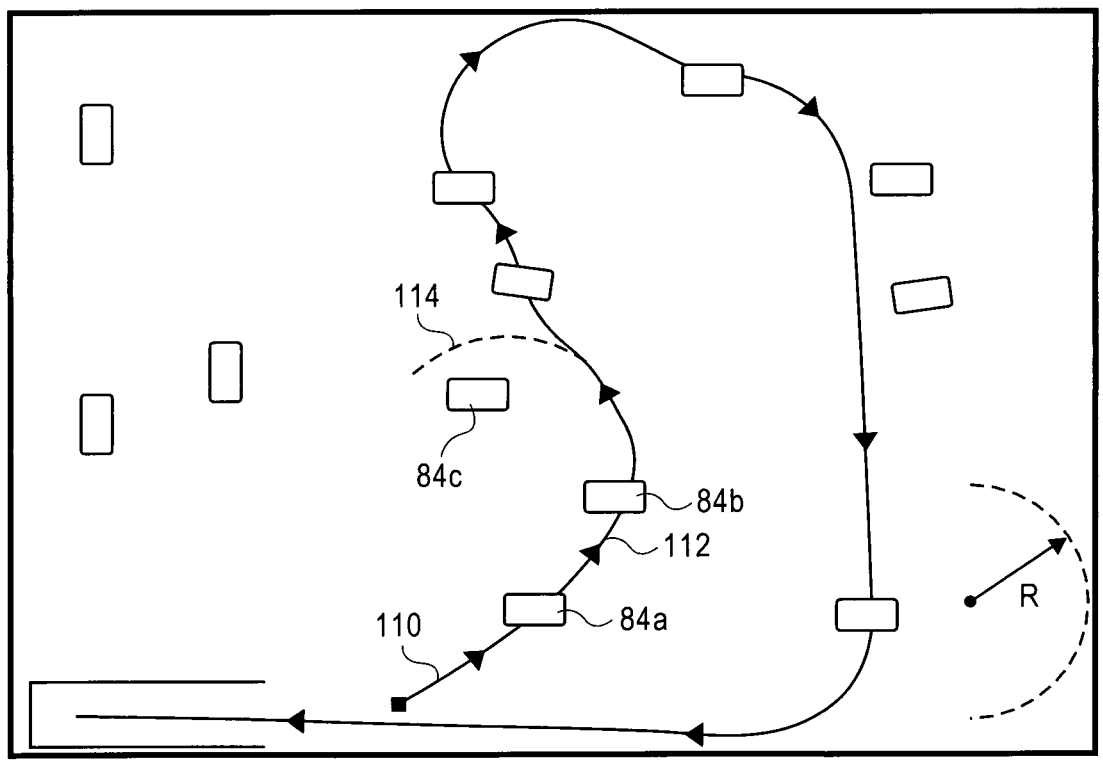
Figure 21:
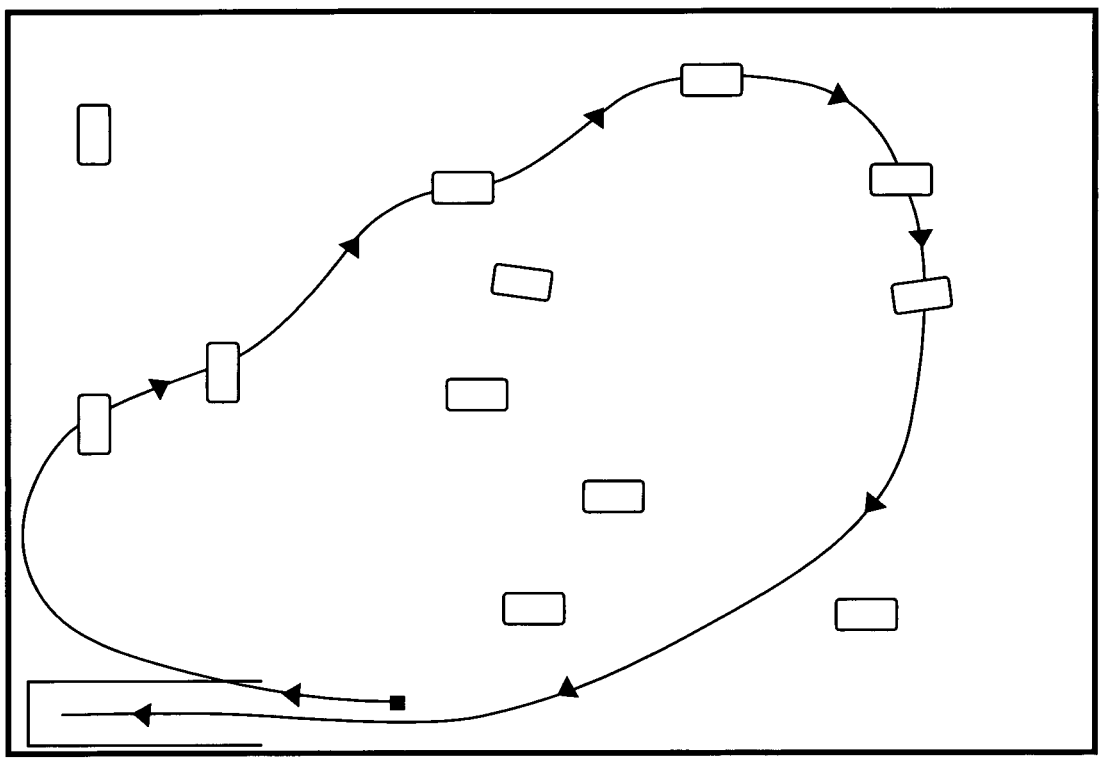

Another possible constraint associated with the machine's travel path while collecting bales may be the machine's minimum turning radius, as explained above. A first exemplary travel path constrained only by the machine's minimum turning radius is illustrated in FIG. 20. A minimum turning radius R associated with the bale collection machine is depicted in the drawing. No segment of the overall travel path can have a radius of curvature less than R. In this scenario the minimum turning radius is the only constraint, such that the travel path intersects the bales at various angles without regard to bale orientation. From the starting position a first segment 110 leads to a first bale 84a and a second path segment 112 leads from the first bale 84a to a second bale 84b. A path segment 114 leading from the second bale 84b to a possible third bale 84c is not viable because the minimum turning radius of the machine would cause it to overshoot the bale 84c. Each of the remaining path segments includes turns with radii no smaller than the minimum turn radius R. Another exemplary bale collection path constrained only by the minimum turning radius is illustrated in FIG. 21.

Figure 22:
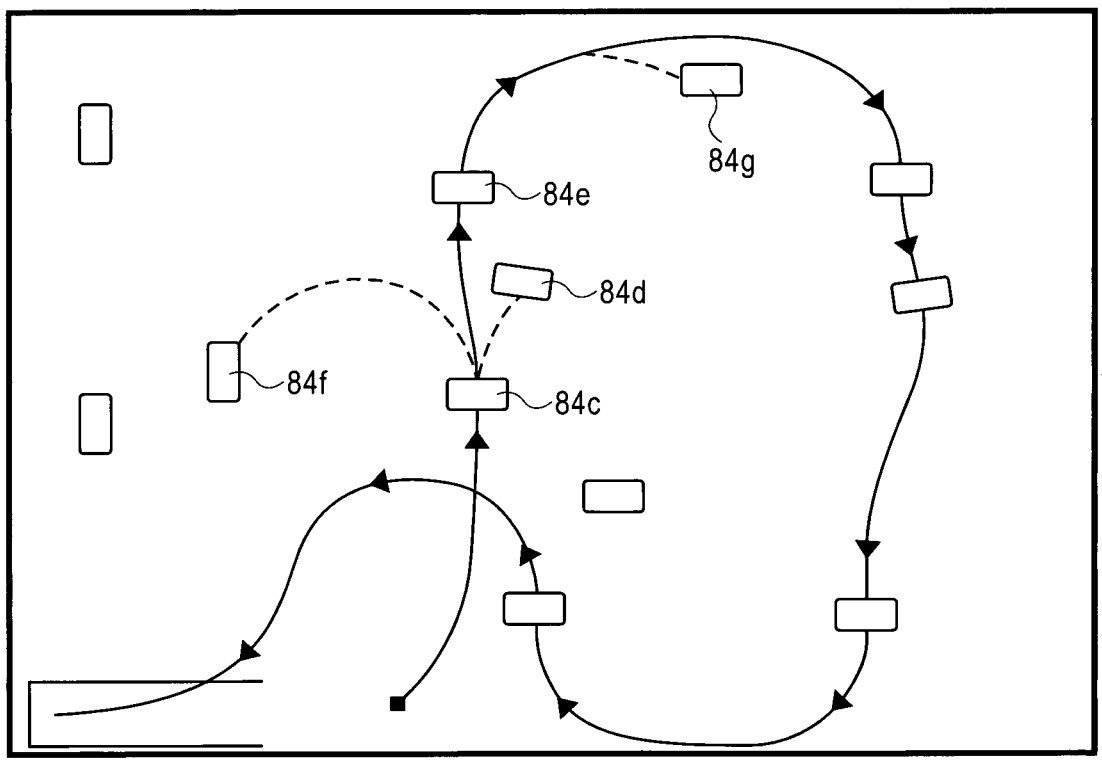
Figure 23:
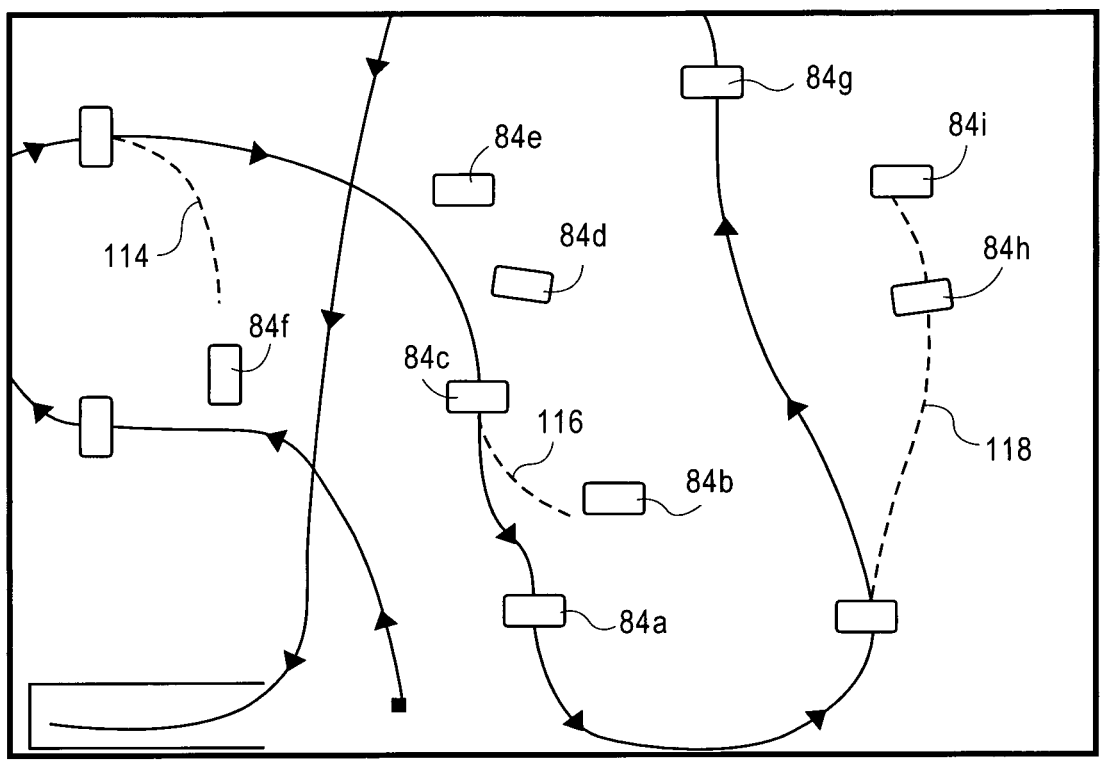

While FIGS. 15-21 illustrate exemplary paths constrained by bale orientation and a machine's minimum turning radius, it will be appreciated that any combination of constraints may be used to define the bale collection path. An exemplary travel path with both bale orientation and minimum turning radius constraints is illustrated in FIGS. 22 and 23. In FIG. 22 after collecting a first bale 84c, the machine could not take the shortest path segment to either bale 84f or bale 84d because, while the machine could engage either of the bales while following the minimum turning radius, it would not be engaging either bale according to the proper orientation. Similarly, after collecting a second bale 84e the minimum turning radius would allow the machine to engage bale 84g, but not at the correct orientation. Therefore the bale 84g is not collected after the second bale.

Another possible travel path for collecting the bales constrained by both a minimum turning radius and bale orientation is illustrated in FIG. 23. Potential travel path segments 114 and 116 are not viable options because the minimum turning radius is too large, the machine would not engage the corresponding bale according to the proper orientation, or both. Potential travel path 118 would allow the machine to engage bale 84h according to the proper orientation, but the machine's minimum turning radius would prevent the machine from avoiding the bale 84i. It is assumed in this example that the bale collection machine holds six bales and the method avoids stopping and backing up the bale collection machine, such that after the machine collects bale 84h it cannot simply collect the next bale 84i. Because the machine's minimum turning radius would prevent it from collecting bale 84i, path segment 118 is not used.

Figure 24:
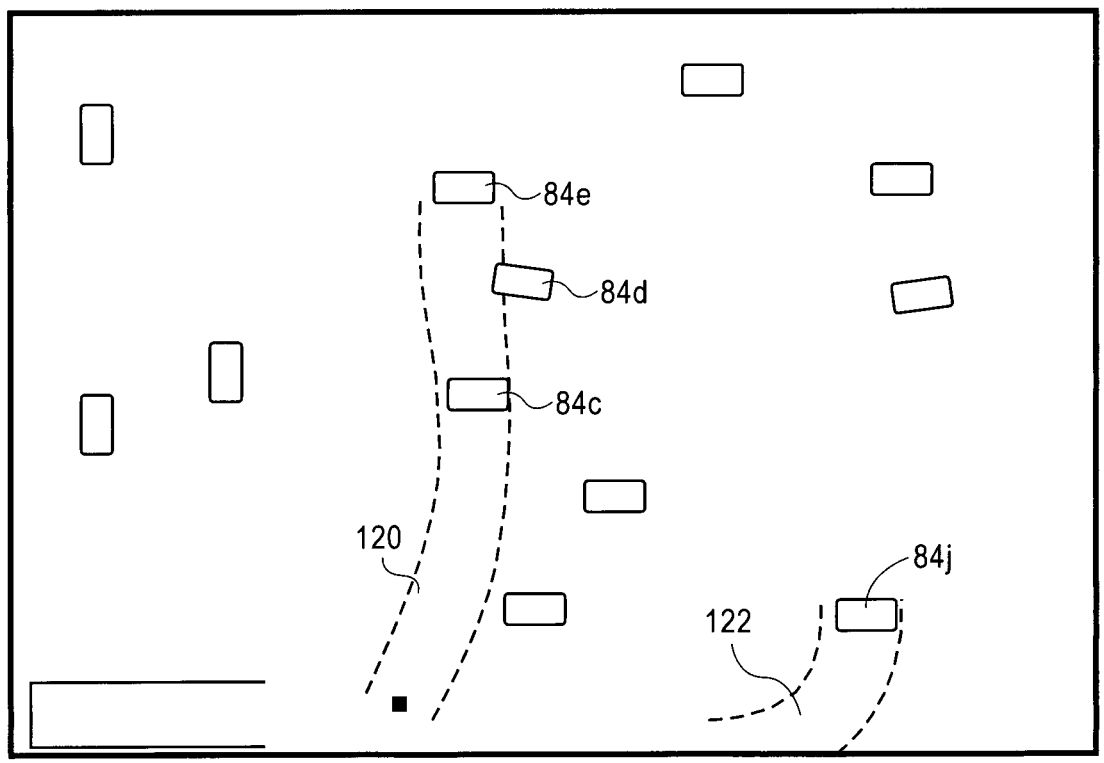

FIG. 24 illustrates exemplary travel path segments where a bale collection machine's travel path profile is a constraint. A first segment 120 could not be used because the machine may collide with bale 84d while travelling between bale 84c and bale 84e. Similarly, a second segment 122 may result in the machine colliding with (or crossing) a boundary when attempting to collect bale 84j, assuming the machine's minimum turning radius prevents it from turning sharply enough to avoid the boundary.

As mentioned above, embodiments of the present invention include systems and methods for automatically selecting one or more preferred travel paths for collecting a plurality of bales dispersed across a ground surface, such as a plurality of bales of hay or straw dispersed throughout a field. By way of example, one or more computing devices, such as the controller 20, may be programmed or configured to perform a method of identifying a preferred path for collecting the bales. The method of identifying the preferred path may take into account the location and orientation of the bales to be collected, the total number of bales that can be carried by the bale collection machine, and may also take into account any collection constraints such as limitations associated with bale orientation, a machine's travel path profile, a machine's minimum turning radius, ground surface characteristics, geographic boundaries, or any combination of these constraints, as explained above. Furthermore, these collection constraints are exemplary in nature and the use of other constraints is within the ambit of the present invention. The present method is described herein as being performed by "a computing device" with the understanding that it may be performed by one or more computing devices that are part of and/or external to a machine's communication and control system, including computing devices that may be located remotely from the machine.

Selecting a preferred travel path may include identifying a travel path that is the shortest and/or the fastest path for collecting a number of the bales. One method of identifying a shortest or fastest path involves identifying all possible travel paths, comparing the length of each of the paths or an estimated travel time for each of the paths, and selecting the path with the shortest length or shortest estimated travel time. This approach may be practical if the total number of possible travel paths is relatively small. As the number of bales to be collected increases, however, the number of possible travel paths for collecting all of the bales increases exponentially and can quickly become too large for even relatively powerful computers to analyze in a timely manner. Thus, in some situations comparing every possible travel path with every other possible travel path to identify the single best path may be impractical or even impossible given the limitations of computing resources available to the system. In those situations the computing device may use one or more methods to identify a preferred travel path that is an estimate or approximation of a best travel path, but not necessarily the shortest, fastest, etcetera.

Figure 25:
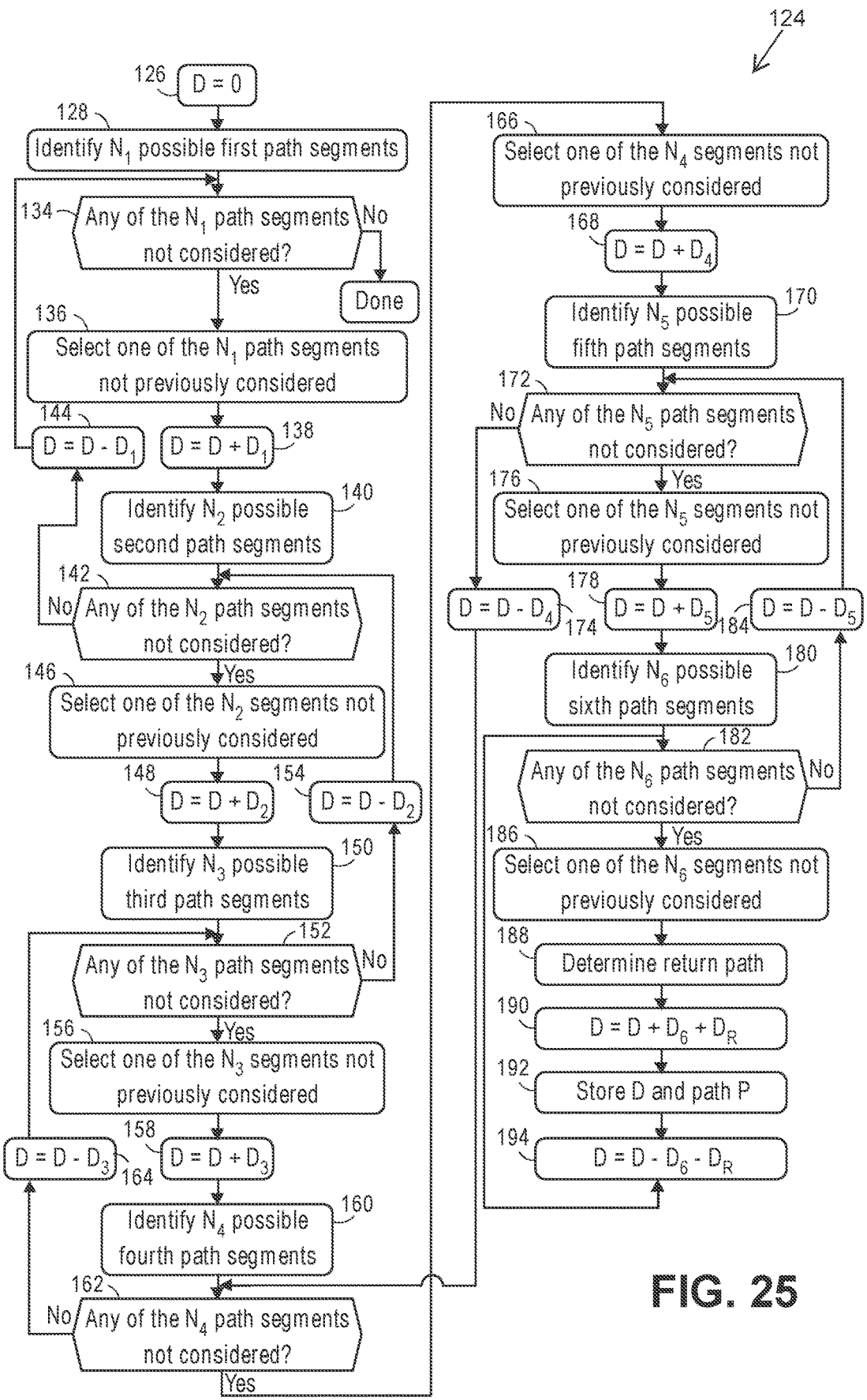
FIG. 25 is a flow diagram illustrating an exemplary method of determining a preferred travel path for collecting a plurality of bales dispersed across the ground surface of a field.
Figure 26:
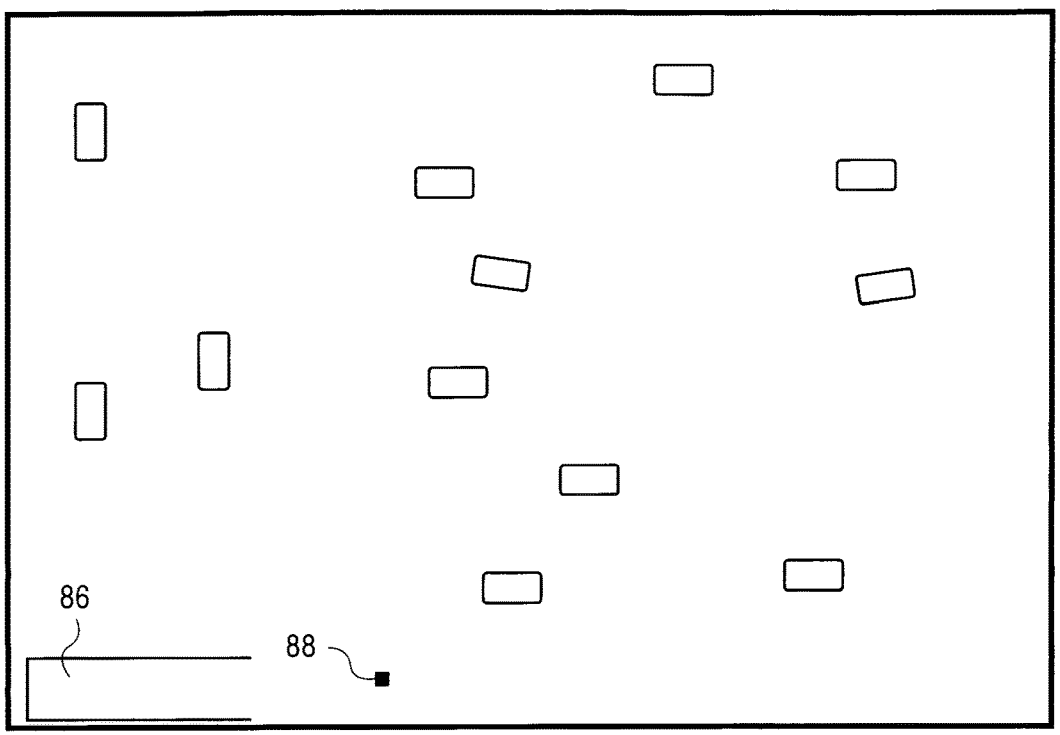

FIG. 25 is a flow diagram illustrating an exemplary method 124 of identifying a preferred travel path for collecting a plurality of bales. The exemplary method 124 illustrated in FIG. 25 involves identifying a preferred travel path for collecting six bales from a plurality of bales randomly dispersed across a ground surface. In this example six bales are collected at a time, which may be a limitation if, for example, the bale collection machine has a six-bale capacity. FIG. 26 illustrates an exemplary scenario in which a plurality of bales are identified for collection. The bales illustrated in FIG. 26 may represent all of the bales to be collected, or may be a subset of a larger number of bales, as explained below.

The method 124 depicted by the flow diagram in FIG. 25 uses the starting point 88 where the bale collection path begins and the bale stack location 86 where the path terminates. Furthermore, the method 124 assumes that the bale collection path is limited by three constraints—namely, bale orientation, the machine's minimum turning radius, and the travel path profile of the machine. Additionally, the method does not generate paths or path segments that require the machine to operate in a reverse direction (in other words, stop and back up). While stopping and reversing the direction of the machine's travel when collecting bales may shorten the total travel distance and/or time in some situations, it may also contribute to machine wear, operator fatigue, or both. Therefore it may be desirable to configure the computing device to consider only bale collection paths that can be completed without reversing the direction of travel of the bale collection machine.

In block 126 of the method 124 a variable D is set to zero. The variable D holds a cumulative length of the travel path and increases with the addition of each travel path segment. Next, $N_1$ possible first path segments are identified, as depicted in block 128, wherein each of the $N_1$ path segments leads to a possible first bale to be collected by the bale collection machine. The number $N_1$ of possible first path segments may include all possible path segments to all of the bales depicted in FIG. 26 or, alternatively, only a subset of those path segments. Only a number of path segments corresponding to a subset of bales closest the starting point 88 may be selected, for example, with the understanding that first collecting bales closest the starting point will typically produce desirable results.

Figure 27:
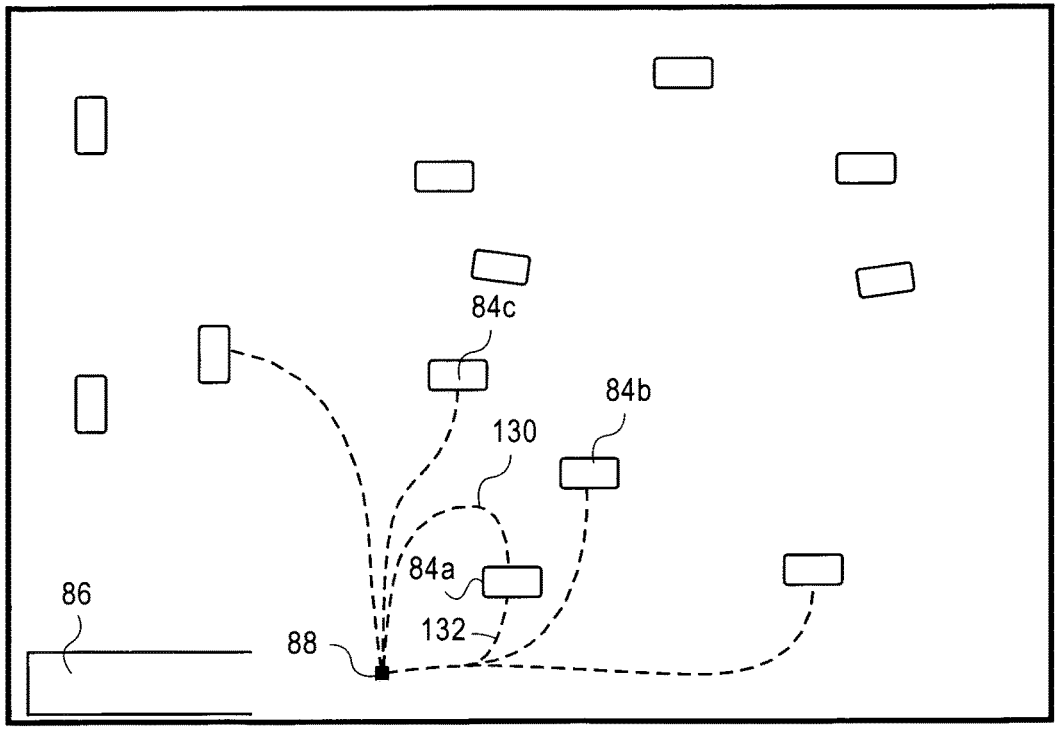

FIG. 27 illustrates $N_1$ possible first path segments (represented in dashed lines) identified by the computing device according to any collection constraints that apply—in this case bale orientation, minimum turning radius, and travel path profile of the bale collection machine. In this example the bale orientation limitation requires the bale collection machine to engage each bale on one of the broad sides of the bale. Thus, there may be two possible paths to each bale—one leading to each of two opposing sides of the bale. An example of this is illustrated with bale 84a, wherein a first possible path segment 130 engages the bale 84a on a first side and a second possible path segment 132 engages the same bale 84a on a second side opposite the first side. The $N_1$ possible first path segments illustrated in FIG. 27 do not represent all of the possible first path segments, but rather a strategically-selected subset of all possible first path segments—in this case six path segments. The illustrated $N_1$ possible first path segments, for example, may be the shortest path segments from the starting point 88. Analyzing a subset of only the shortest path segments from the starting point is one way of optimizing the method to find a preferred bale collection path without analyzing every possible path.

Figure 28:
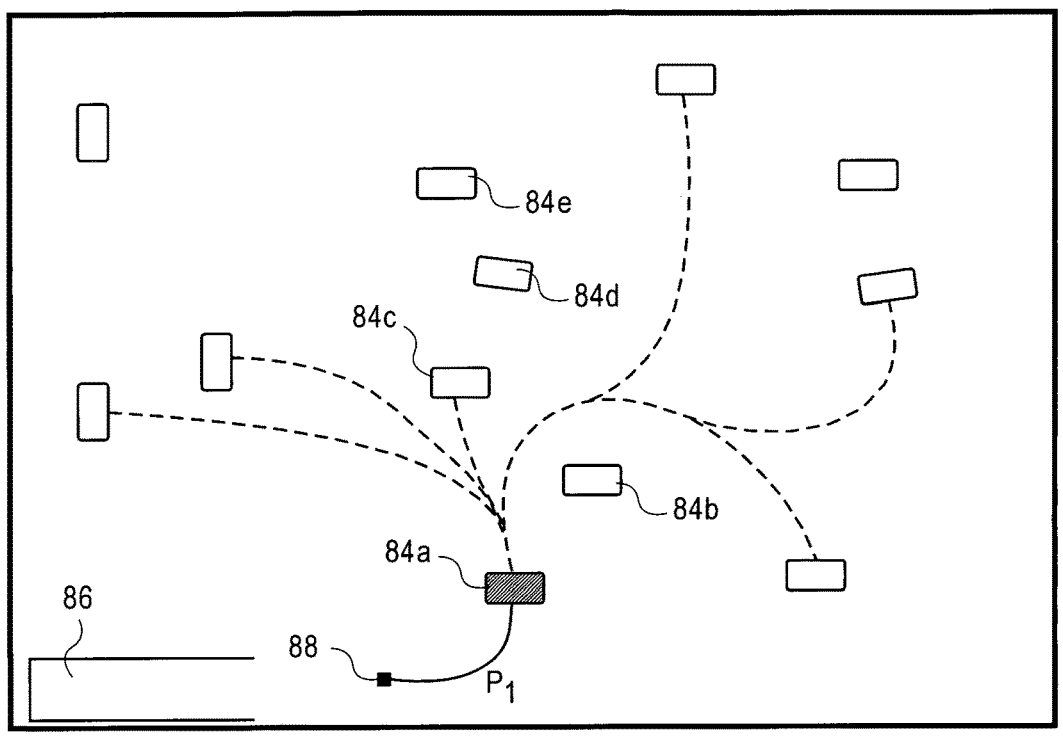

The computing device then determines whether any of the $N_1$ path segments have not been considered, as depicted in block 134. Each of the $N_1$ path segments will ultimately be considered, but block 134 will resolve "yes" until each of the $N_1$ path segments has been analyzed as a starting path segment for bale collection. If block 134 resolves "yes," one of the path segments $N_1$ not previously considered is selected, as depicted in block 136. As illustrated in FIG. 28 a first path segment $P_1$ is selected from the $N_1$ possible first path segments. Once the path to the first bale is selected, the length of the path $P_1$ is determined and added to the variable D, as depicted in block 138, where $D_1$ represents the length of path segment $P_1$. At this point the variable D will be equivalent to the distance $P_1$ because it is the first path segment and no values were previously added to D.

Next, $N_2$ possible second path segments are identified, as depicted in block 140. The $N_2$ possible second path segments represent path segments from the first bale 84a to possible second bales. FIG. 28 illustrates six possible path segments that may be selected for the second segment of the bale collection travel path. The possible path segments illustrated in FIG. 28 may be the shortest path segments available from the first bale 84a to surrounding bales. Thus, a path segment to bale 84b may not be considered because the machine turning radius would not allow the machine to travel to the bale 84b after collecting the first bale 84a without following a relatively long, circuitous path segment with an appropriate turning radius that would render the path segment longer than other possible travel path segments to bales in the vicinity of the first bale 84a. Similarly, a path segment to the bale 84d may not be included if the bale cannot be collected while bales 84c and 84e are still on the field due to the travel path profile of the bale collection machine.

Figure 29:
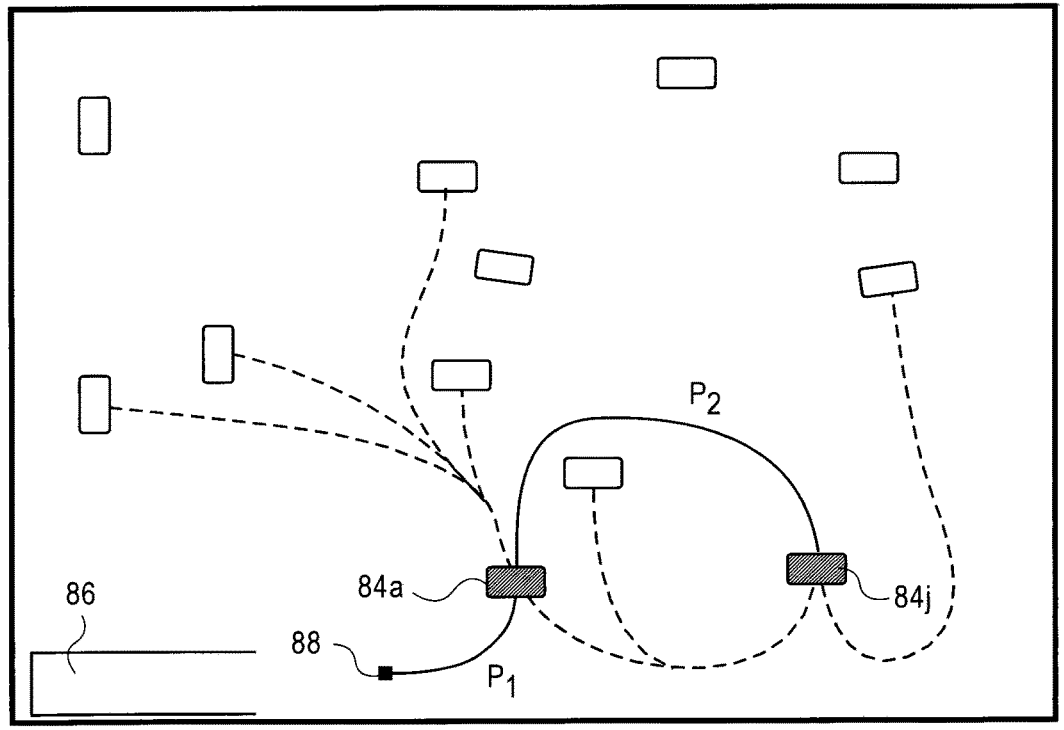

Once the $N_2$ possible second path segments are identified, the computing device determines whether any of the $N_2$ possible second path segments have not been considered, as depicted in block 142. If none of the $N_2$ path segments have not been considered (that is, if all of the $N_2$ path segments have been considered), the computing device decreases the value of D by $D_1$, as depicted in block 144, and returns to the step depicted in block 134 in preparation for analyzing another of the $N_1$ possible first path segments. If any of the identified $N_2$ path segments have not been analyzed the computing device selects one of the $N_2$ path segments not previously considered, as depicted in block 146. FIG. 29 illustrates a second path segment $P_2$ selected from among the $N_2$ possible second travel path segments and running between the first bale 84a and a second bale 84j. The variable D is increased by an amount $D_2$ corresponding to the length of the second path segment $P_2$, as depicted in block 148. At this point the variable D is equal to the total length of first and second travel path segments $P_1$ and $P_2$.

Figure 30:
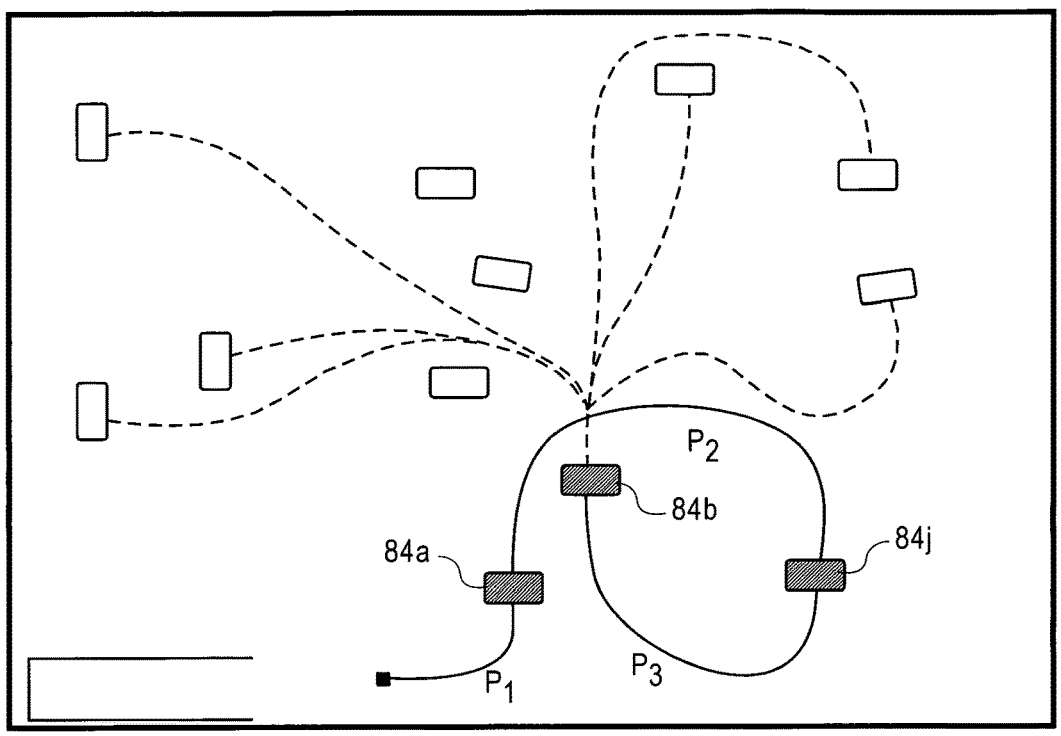

The computing device then identifies $N_3$ possible third path segments, as depicted in block 150 and illustrated in FIG. 29. The $N_3$ possible third path segments are path segments from the second bale 84j to possible third bales, and may be the shortest six path segments originating from the second bale 84j to bales not already on the travel path. Because the first bale 84a would have already been collected, the computing device may include possible path segments that pass through the location of the first bale 84a. The computing device then determines whether any of the $N_3$ possible third path segments have not been considered, as depicted in block 152. If not (that is, if all of the $N_3$ possible third path segments have been considered), the value of the variable D is decreased by the amount $D_2$, as depicted in block 154, and the computing device returns to the step depicted in block 142 in preparation for analyzing another of the $N_2$ possible second path segments. If any of the $N_3$ possible third path segments have not been considered, the computing device selects one of the $N_3$ possible path segments not previously considered, as depicted in block 156. FIG. 30 illustrates a third travel path segment $P_3$ selected, connecting the second bale 84j with a third bale 84b. The variable D is increased by an amount $D_3$ corresponding to the length of the third path segment $P_3$, as depicted in block 158.

Figure 31:
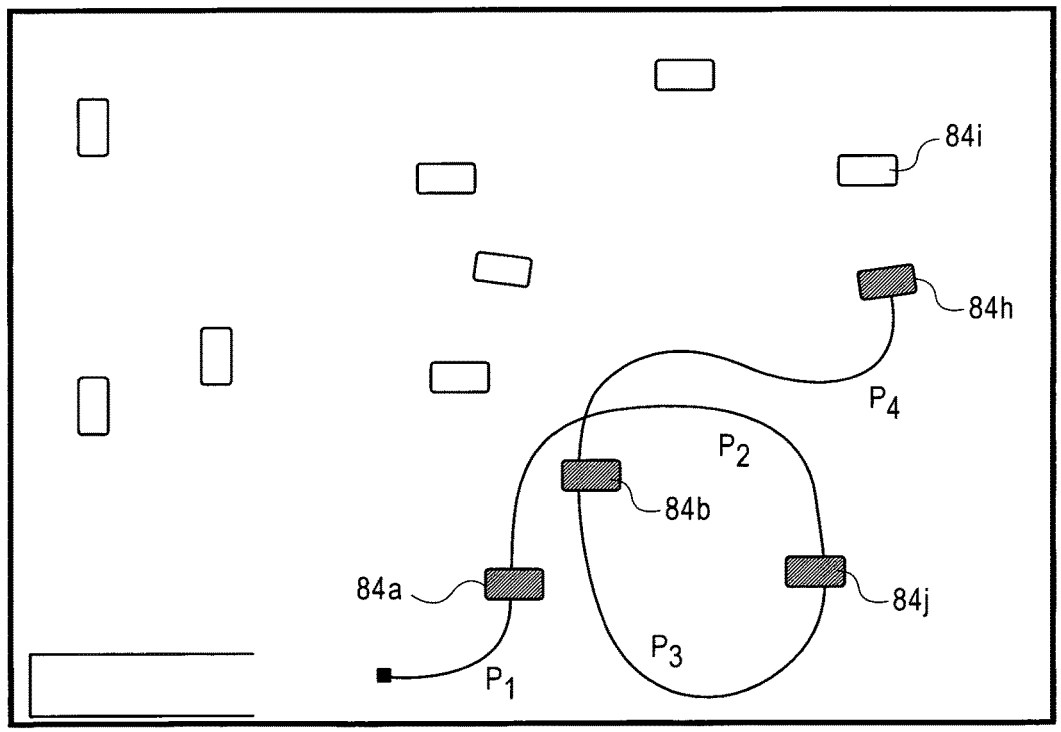

The computing device then identifies $N_4$ possible fourth path segments, as depicted in block 160 and illustrated in FIG. 30. The $N_4$ possible fourth path segments are path segments from the third bale 84b to possible fourth bales, and may be the shortest six possible path segments originating from the third bale to bales not already on the travel path. Travel paths to certain bales that are relatively close to the third bale 84b may not be selected for consideration because constraints may require the bale collection machine to travel an indirect path to the bales, resulting in those travel path segments being relatively long as explained above. The computing device then determines whether any of the $N_4$ possible fourth path segments have not been analyzed, as depicted in block 162. If not (that is, if all of the $N_4$ possible fourth path segments have been considered), the system decreases the value of the variable D by the amount $D_3$, as depicted in block 164, and returns to the step depicted in block 152 in preparation for analyzing another of the $N_3$ possible third path segments. If any of the $N_4$ possible fourth path segments have not been considered, the computing device selects one not previously considered, as depicted in block 166. FIG. 31 illustrates a selected fourth travel path segment $P_4$ selected connecting the third bale 84b with a fourth bale 84h. The variable D is increased by an amount $D_4$ corresponding to the length of the fourth path segment $P_4$, as depicted in block 168.

The computing device then identifies $N_5$ possible fifth path segments, as depicted in block 170. The $N_5$ possible fifth path segments are path segments from the fourth bale 84h to possible fifth bales, and may be the shortest six possible path segments originating from the fourth bale 84h to bales not already on the travel path. In the particular scenario illustrated in FIG. 31, one bale 84i not already on the travel path is particularly close to the fourth bale 84h, therefore the computing device may simply automatically select a path segment to that bale 84i, reducing $N_5$ to one and not considering other possible fifth travel path segments. The computing device may automatically select the travel path to the bale 84i because it is less than a threshold length, for example, or because the travel path profile of the bale collection machine would not permit the machine to collect the fourth bale 84h without also collecting the bale 84i (or backing up, which the present method avoids).

Figure 32:
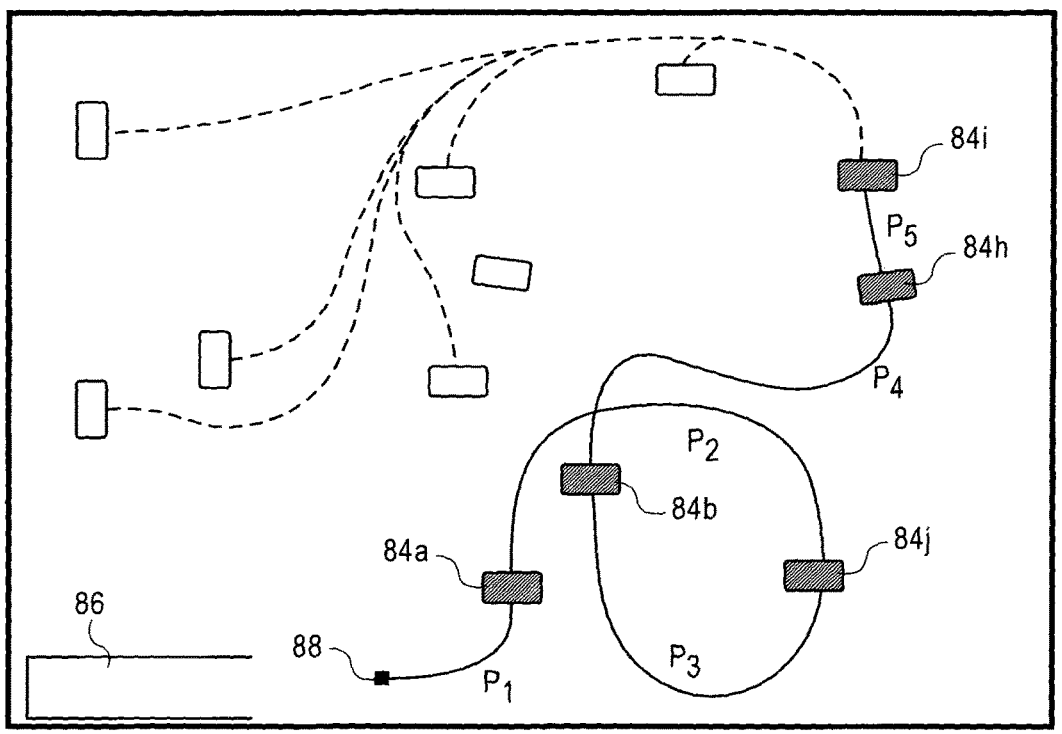

The computing device then determines whether any of the $N_5$ possible fifth path segments have not been considered, as depicted in block 172. If not (that is, if all of the $N_5$ possible fifth path segments have been considered), the computing device decreases the value of the variable D by the amount $D_4$, as depicted in block 174, and returns to the step depicted in block 162 in preparation for analyzing another of the $N_4$ possible fourth path segments. If any of the $N_5$ possible fifth path segments have not been considered, the computing device selects one not previously considered, as depicted in block 176. FIG. 32 illustrates a selected fifth travel path segment $P_5$, connecting the fourth bale 84h with a fifth bale 84i. The variable D is increased by an amount $D_5$ corresponding to the length of the fifth path segment $P_5$, as depicted in block 178.

Figure 33:
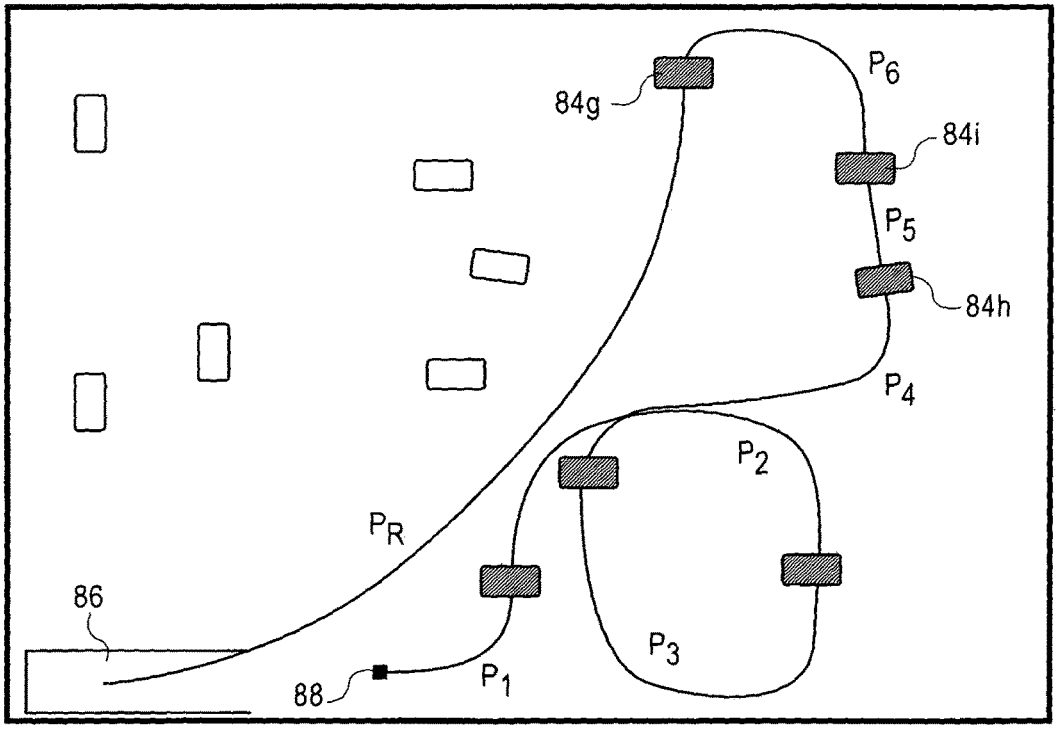

The computing device then identifies $N_6$ possible sixth path segments, as depicted in block 180 and illustrated in FIG. 32. The $N_6$ possible sixth path segments are path segments from the fifth bale 84i to possible sixth bales, and may be the shortest six possible path segments originating from the fifth bale 84i to bales not already on the travel path. The computing device then determines whether any of the $N_6$ possible sixth path segments have not been considered, as depicted in block 182. If not (that is, if all of the $N_6$ possible sixth path segments have been considered), the computing device decreases the value of the variable D by the amount $D_5$, as depicted in block 184, and returns to the step depicted in block 172 in preparation for analyzing another of the $N_5$ possible fifth path segments. (In this example the number of $N_5$ possible fifth path segments is one, as explained above, and that one path segment has been considered, therefore the step depicted in block 172 will resolve "no" and the computing device performs the step depicted in block 162.) If any of the $N_6$ possible sixth path segments have not been considered, the computing device selects one not previously considered, as depicted in block 186. FIG. 33 illustrates a selected sixth travel path segment $P_6$ connecting the fifth bale 84i with a sixth bale 84g. In this example the bale collection machine only collects six bales at a time, therefore after the sixth bale 84g is collected the bale collection machine is full and the computing device determines a return path segment PR from the sixth bale 84g to the bale stacking location 86, as depicted in block 188 and illustrated in FIG. 33.

The computing device increases the variable D by an amount $D_6$, corresponding to the length of the sixth path segment $P_6$, and an amount $D_R$, corresponding to the length of the return path segment $P_R$, as depicted in block 190. At this point the travel path is complete, so the variable D and the final, complete travel path P will be stored for later use, as depicted in block 192. The computing device then decreases the value of the variable D by the amounts $D_6$ and $D_R$, as depicted in block 194, and returns to the step depicted in block 182 in preparation for analyzing another of the $N_6$ possible sixth path segments.

Figure 34:
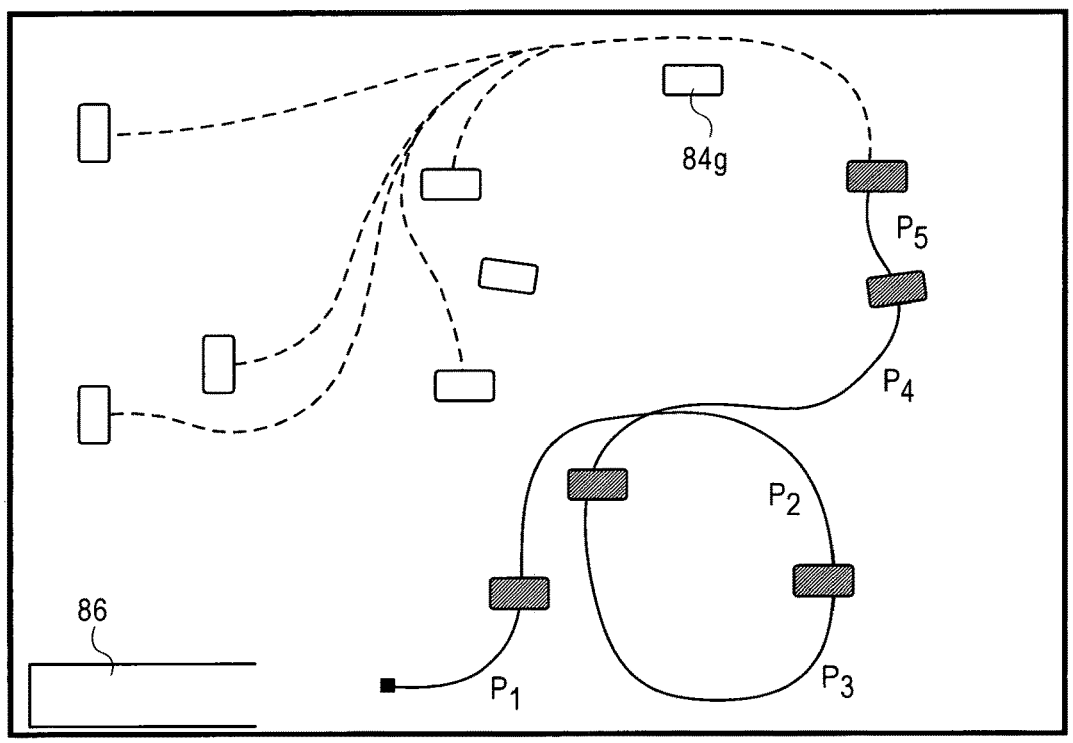

When the computing device returns to the step depicted in block 182, five of the six $N_6$ possible sixth path segments have not been analyzed, as depicted in FIG. 34. No possible path to bale 84g is depicted in FIG. 34 because that path segment was already considered as part of the first travel path. Because some of the $N_6$ possible sixth path segments have not been analyzed, another path segment is selected as depicted in block 186. A return path is determined from the newly-selected sixth bale to the stacking location 86, as depicted in block 188, the total travel distance associated with the bale collection path is determined as depicted in block 190, the total distance and the path definition are stored as depicted in block 192, the value of D is decreased by $D_6$ and $D_R$, as depicted in block 194, and the computing device returns to the step depicted in block 182 in preparation for considering another of the $N_6$ possible sixth path segments.

The steps depicted in blocks 182 through 194 are repeated until each of the $N_6$ possible paths have been analyzed. Each time a path with a different sixth path segment is analyzed a unique travel path and a unique travel path distance D are generated. Each of these travel paths and distance values are stored in computer memory or otherwise in a manner usable by the computing device, and may be in the form of a data table similar to the table illustrated in FIG. 39. After the method has performed steps 182 through 194 for each of the $N_6$ possible sixth path segments, the question in block 182 resolves "no," the value of the variable D is decreased by the amount $D_5$ as depicted in block 184, and execution of the method 124 returns to block 172.

Figure 35:
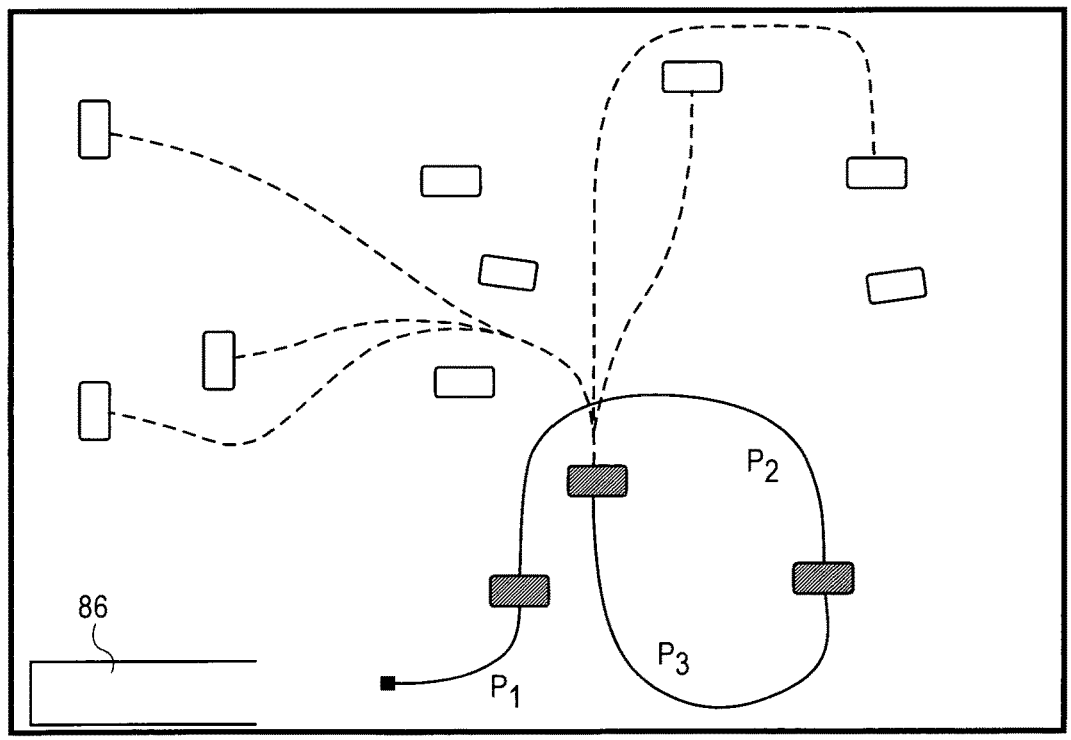
Figure 36:
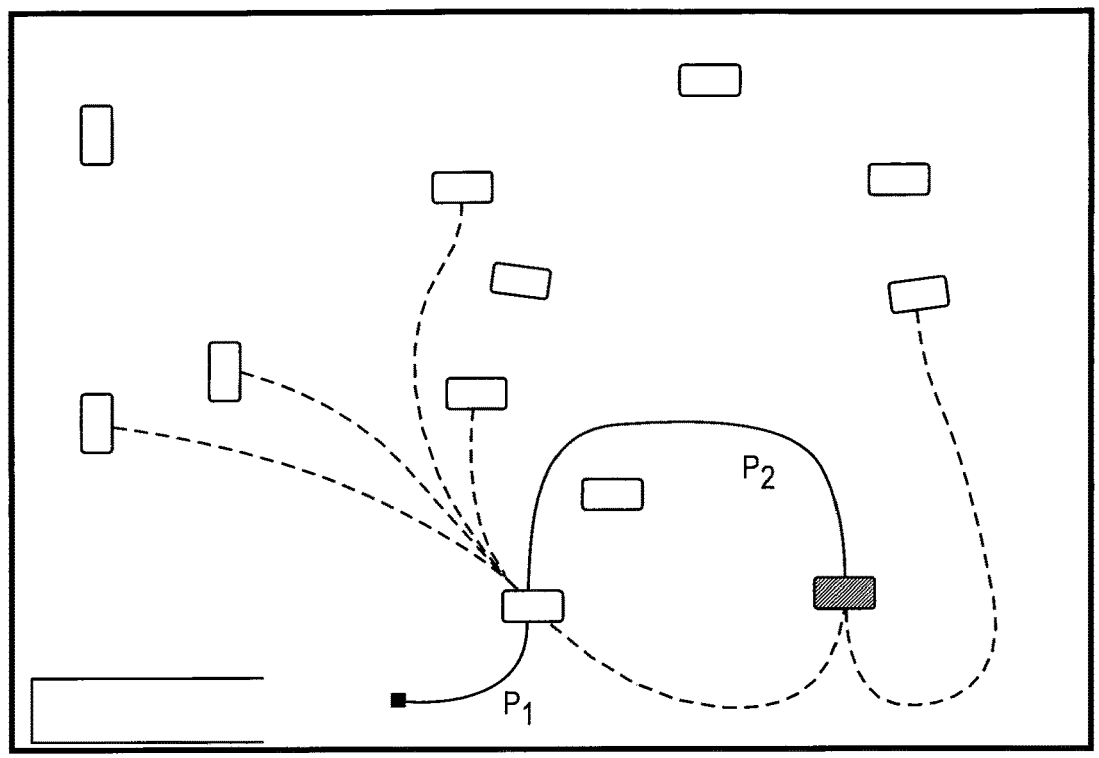
Figure 37:
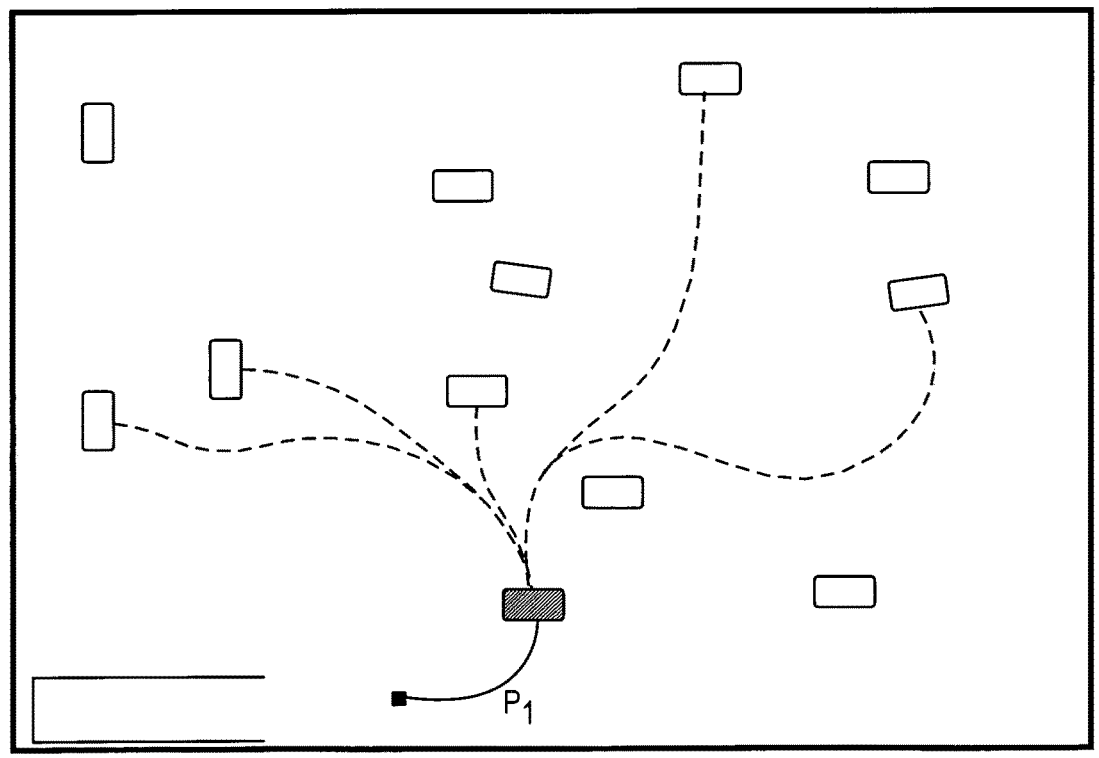
Figures 38, 39:
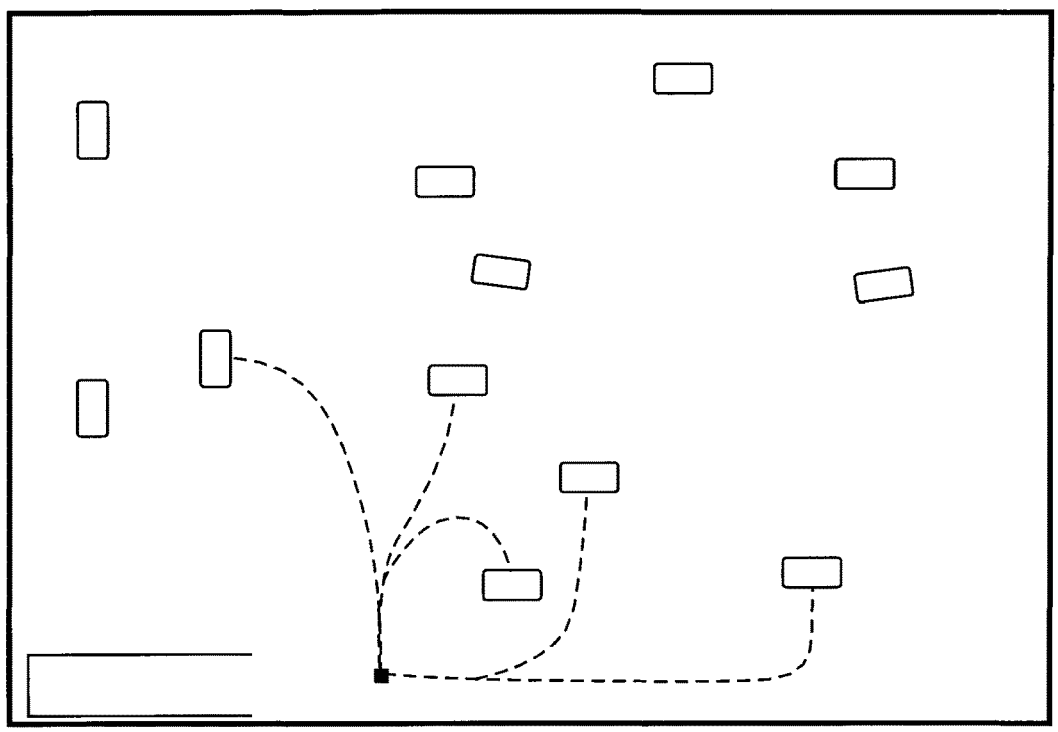

The steps depicted in blocks 172 through 194 are repeated for each of the $N_5$ possible fifth path segments and for each of the $N_6$ possible six path segments corresponding to each of the $N_5$ possible path segments. After each of the $N_5$ possible fifth path segments have been considered the question in block 172 resolves "no" and execution of the method returns to block 162 as indicated in the flow diagram. Steps 162 through 194 are repeated for each of the $N_4$ possible path segments and for each of the $N_5$ possible fifth and $N_6$ possible six path segments corresponding to each of the $N_4$ possible path segments. FIG. 35 illustrates the remaining $N_4$ possible fourth path segments after the first of the $N_4$ possible fourth path segments has been considered. After each of the $N_5$ possible fourth path segments has been considered the question in block 162 resolves "no" and execution of the method returns to block 152. This process continues until all of the $N_1$ possible first path segments have been analyzed with each of the $N_2$, $N_3$, $N_4$, $N_5$ and $N_6$ path segments corresponds to each of the $N_1$ path segments. FIG. 36 illustrates the five remaining $N_3$ possible third path segments after the first one is analyzed, FIG. 37 illustrates the five remaining $N_2$ possible second path segments after the first one is analyzed, and FIG. 38 illustrates the five remaining $N_1$ possible first path segments after the first one is analyzed. Each time the computing device selects a sixth path segment, it also generates a return path segment, determines the final value of D and stores a path definition and D for later comparison.

FIG. 39 depicts the contents of a portion of an exemplary data table used by the computing device to store and compare possible bale collection paths. A first column 196 includes a collection path identifier, which may simply be a number associated with each possible path. A second column 198 includes a path description, which may be or include a series of geographic locations describing the path. A third column 200 includes a total travel distance (or other characteristic, such as estimated travel time) associated with the path. By storing this information the computing device can compare characteristics of each travel path and identify a preferred travel path. The preferred travel path may be, for example, the path with the shortest travel distance or estimated travel time as indicated in the third column 200. If the computing device follows the method depicted in the flow diagram 124 and considers six possible options for each of six path segments, the number of possible bale collection paths in the table would be 46,656.

Figure 40:
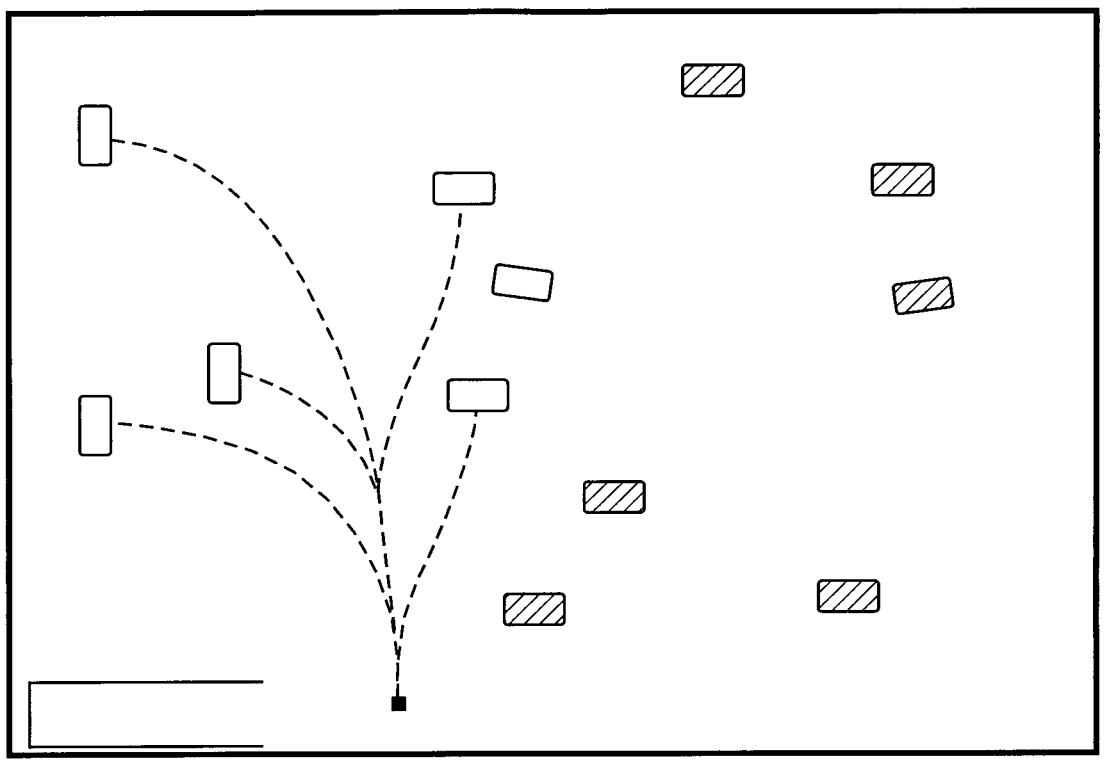
Figure 41:
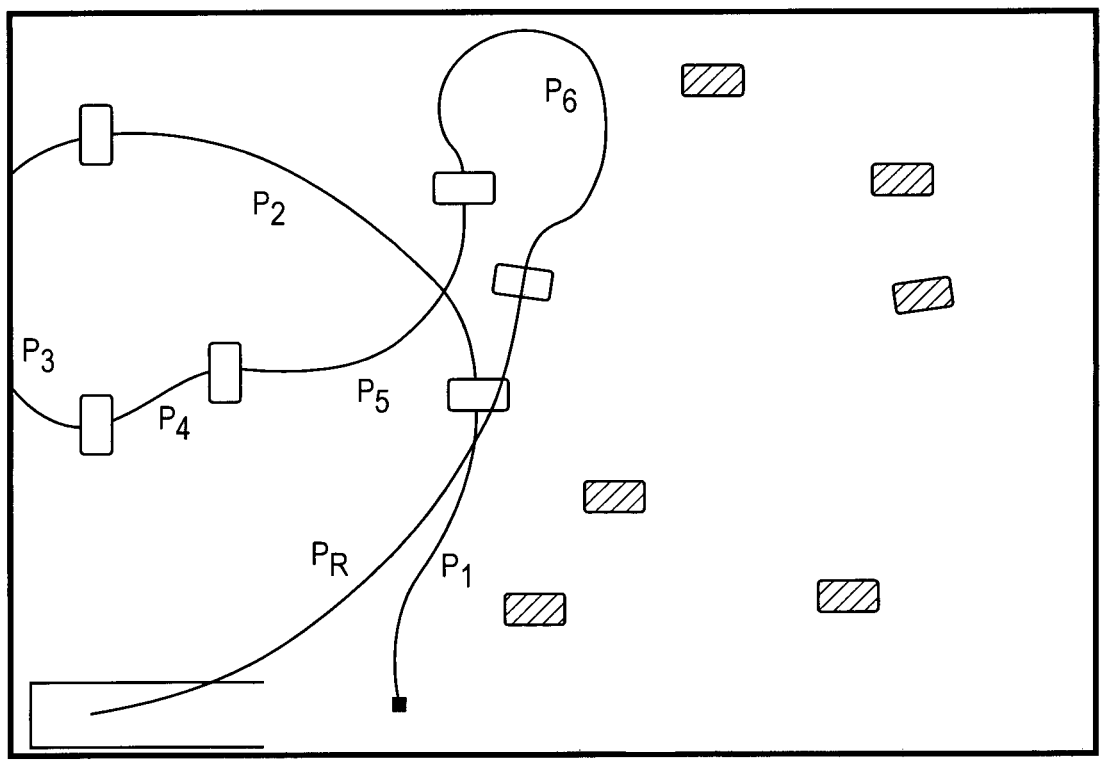

Using the method depicted in FIG. 25, the computing device determines a preferred travel path for collecting six bales and placing the six collected bales at the stack location. In one embodiment of the invention the computing device identifies a collection path for collecting six bales and, after the machine collects the bales identifies another collection path for collecting another six bales. In another embodiment of the invention the computing device identifies multiple consecutive possible bale collection paths and compares the total travel distance or total estimate travel time (or other characteristic) of the combination of collection paths to identify a preferred bale collection path combination. By way of example, in the scenario depicted in FIGS. 26-38 and described above, the computing device may identify two consecutive bale collection paths each for collecting six bales. In that example, a first possible collection path is illustrated in FIG. 33. After identifying that path the computing device may then identify a plurality of possible second collection paths to collect the remaining bales not collected as part of the first possible collection path. As illustrated in FIG. 40 the computing device may identify a plurality of first possible path segments leading to a first bale of the second path. The computing device may follow the method set forth in the flow diagram 124 and described above to consider each of the possible first bale collection paths and each of the second, third, fourth and so on possible subsequent path segments associated with each of the first path segments to identify a second collection path to collect the remaining bales. One exemplary second completed bale collection path is illustrated in FIG. 41.

Once the computing device has identified two consecutive bale collection paths, it adds the total distance or total estimated travel time (or other characteristic) of the first path and the second path and stores the summed total. The computing device may determine a second preferred travel path for each first travel path and store information about the first collection path, the second collection path, and the total distance or total time (or other characteristic) associated with that particular combination. FIG. 42 depicts information stored in an exemplary data table used by the computing device wherein a first column 202 includes an identifier associated with the combination of paths, a second column 204 includes an identifier associated with a first path, a third column 206 includes a travel distance (or other characteristic, such as an estimated travel time) associated with the first path, a fourth column 208 includes an identifier associated with a second path, a fifth column 210 includes a travel distance (or other characteristic) associated with the second path, and a sixth column 212 includes the sum of the travel distances of the first and second paths. In the table depicted in FIG. 42, rows one through seven depict a first path (A1) coupled with several different second paths (B1-B7). There could be many thousands of combinations of paths involving the first path A1. A second path A2 is considered along with a plurality of different paths, and so forth.

The computing device identifies a preferred combination of bale collection paths with, for example, the shortest total travel distance. This method has the advantage of taking into account how a first collection path may affect a second collection path. The shortest or fastest first collection path, for example, may result in a long second collection path such that the combination of the first collection path and the second collection path is longer than other combinations. In this example the computing device analyzes combinations of two bale collection paths, but the invention is not so limited. The computing device may be configured to analyze combinations of three, four, five or more bale collection paths using the same technique set forth above for analyzing two bale collection paths. Analyzing combinations of multiple collection paths has the advantage of determining a best or preferred overall bale collection plan taking into account multiple or even all of the required collection paths.

As explained above the method illustrated by the flow diagram 124 is exemplary in nature and other methods of selecting a preferred travel path may be used and are within the ambit of the invention. While the method described analyzes six possible travel path segments at each stage, the invention is not so limited and more or fewer path segments may be analyzed at each stage. By way of example, three, four, five, seven, eight, nine or ten segments may be evaluated at teach stage. Furthermore, the number of possible path segments evaluated at each stage may be different, such as where more possible path segments are evaluated in each of the first three stages and fewer possible path segments are evaluated in each of the last three stages. Additionally, while the bale collection path includes six path segments plus a return path, bale collection paths with more or fewer path segments may be used. This may be required, for example, where the bale collection machine is capable of collecting more or fewer than six bales at a time, or where the operator prefers not to fill the bale collection machine at each bale collection path.

Figure 43:
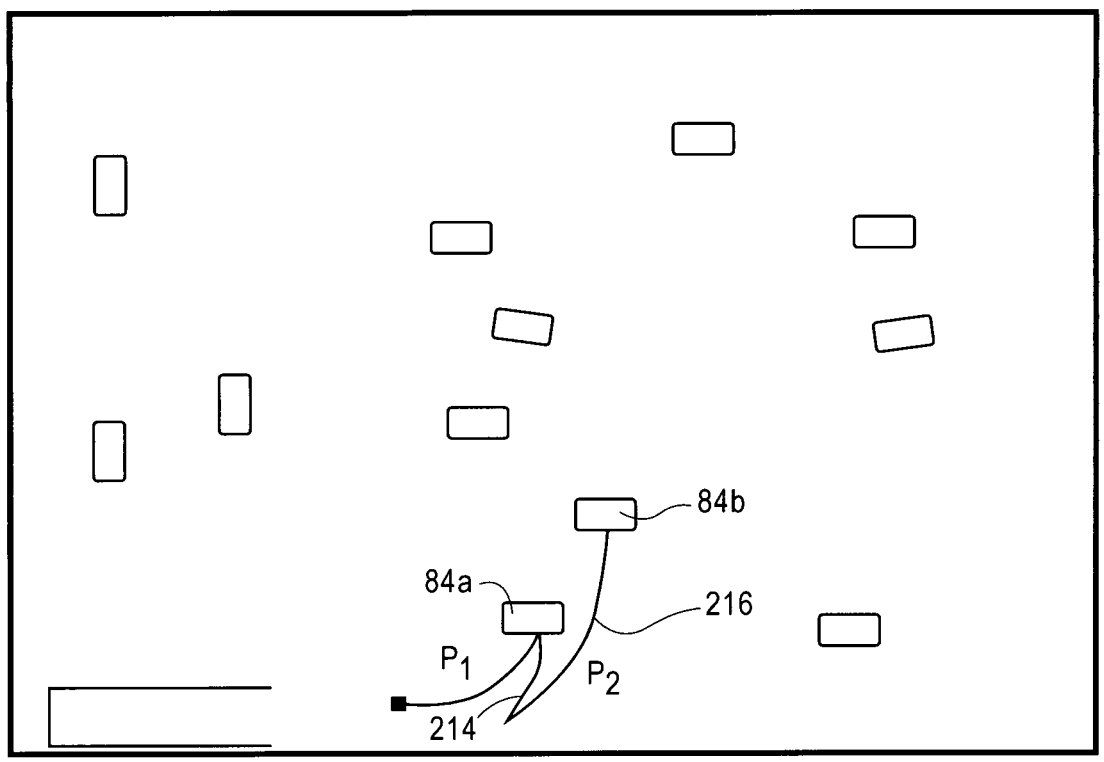
FIGS. 43-45 illustrate a plurality of bales in a field and various path segments that may be used to collect the bales according to a method that involves collecting bales on both a front and a rear of a bale collection machine.

As mentioned above the method depicted by flow diagram 124 identifies a preferred bale collection path that does not require the bale collection machine to reverse direction (that is, stop and back up or drive in reverse). The present invention is not so limited, however, and methods of identifying a preferred bale collection path that does involve the bale collection machine operating in a reverse direction are within the ambit of the invention. One example is illustrated in FIG. 43, where a first path segment $P_1$ to a first bale 84a includes only a forward portion, and a second path segment $P_2$ to a second bale 84b includes a reverse portion 214 and a forward portion 216 such that the machine reverses direction (backs up) after collecting the first bale 84a in order to be in a position to collect the second bale 84b.

Figure 14:
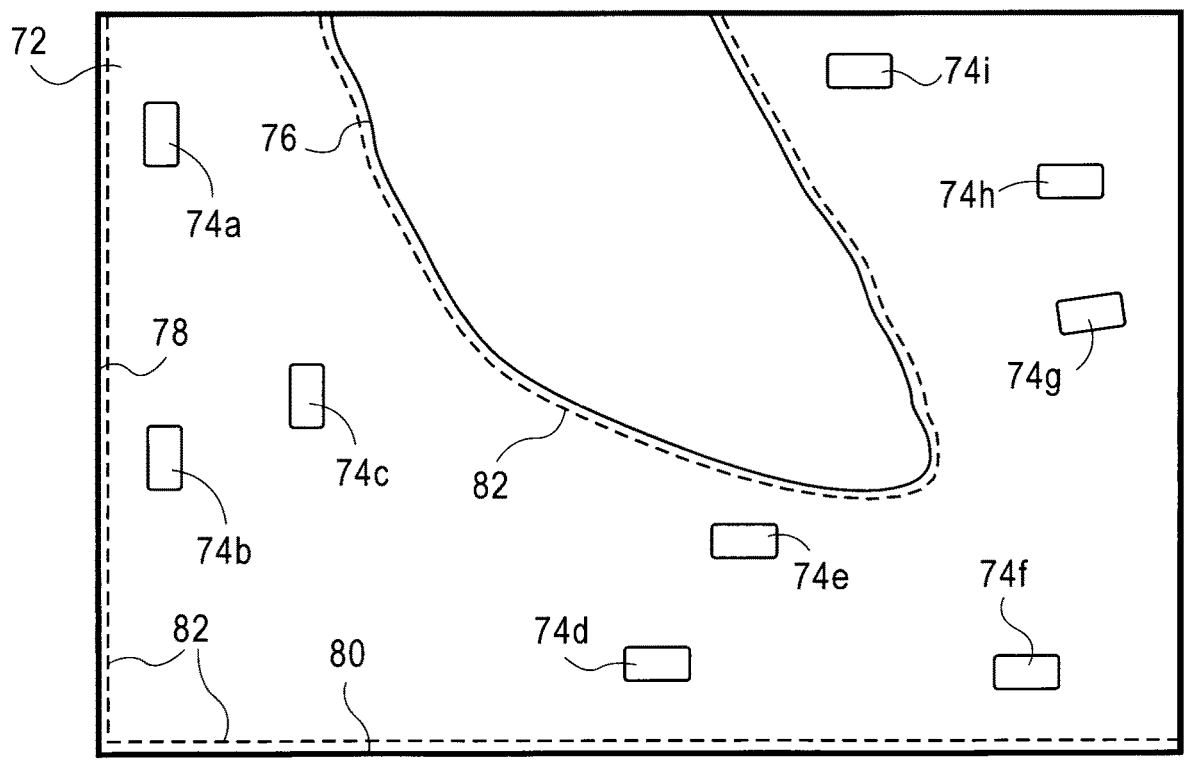

In some scenarios it may be necessary for a machine to back up multiple times during a collection operation, such as in the field illustrated in FIGS. 13 and 14. Bales 74a, 74b, 74d, 74e and 74f are near enough to the boundaries 76, 78 and 80 that a bale collection machine may have to back up after collecting each one of those bales.

Figure 44:
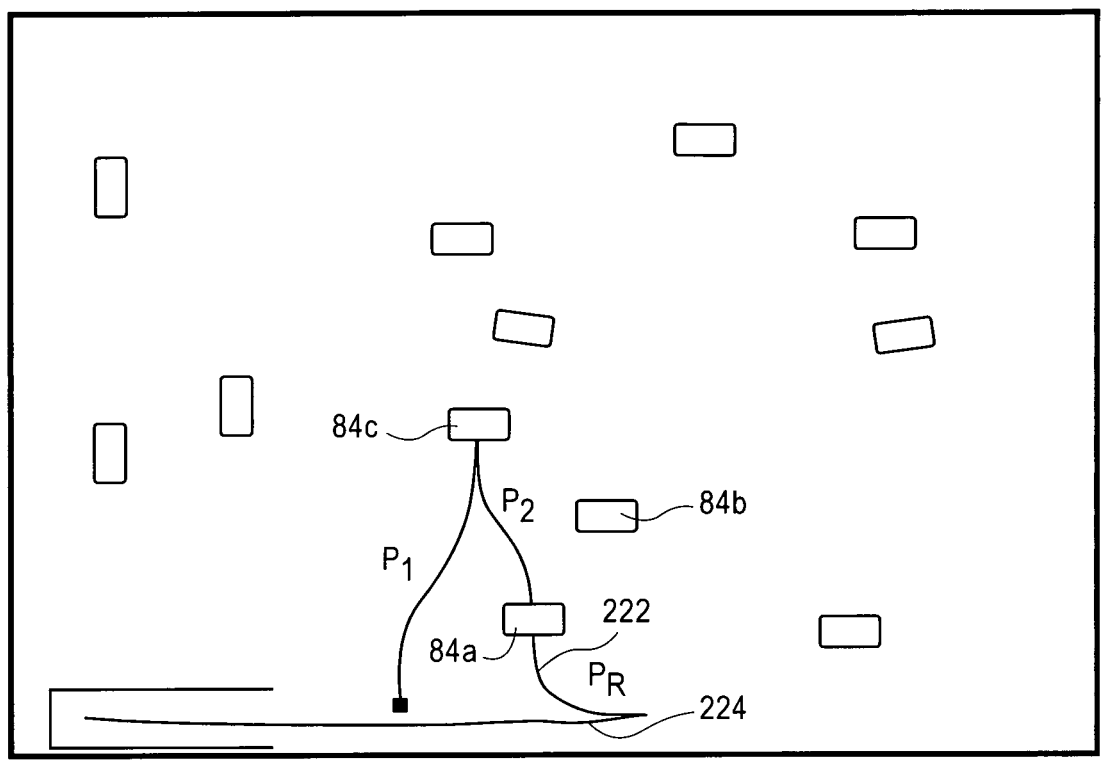

In the scenarios discussed above the bale collection machine engages bales at the front of the machine only. In other scenarios a bale collection machine may engage bales at a front and a rear of the machine, such as where the machine is a tractor with one or more bale forks mounted on linkages on each of the front and the rear of the tractor. In those scenarios it may be necessary for the machine to drive in reverse to engage a bale using a bale fork (or other device) mounted on a rear of the machine. Embodiments of the present invention involve a system and method capable of determining a preferred path for collecting bales that involves the bale collection machine engaging one or more bales in a reverse direction. An exemplary bale collection path is illustrated in FIG. 44 that includes a first travel path segment $P_1$ traversed in the forward direction, a second travel path segment in $P_2$ traversed in the reverse direction, and a return path segment $P_R$ that includes a first portion 222 traversed in a reverse direction and a second portion 222 traversed in a forward direction. In this example the bale collection machine holds two bales—one in a front of the machine and one in a rear of the machine.

Figure 45:
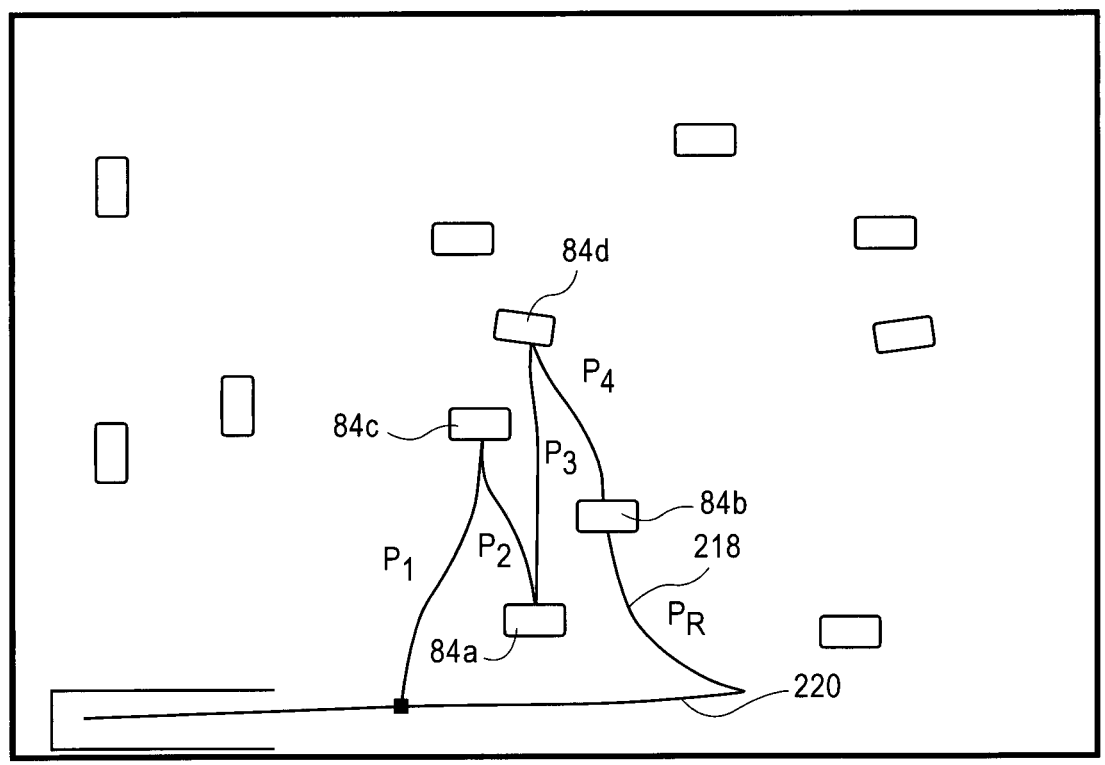

In other scenarios the machine may be configured to hold multiple bales on the front of the machine, on the rear of the machine, or both. In those scenarios it may be necessary or preferred for the machine to alternate between the front and rear when collecting bales. If a tractor is equipped to collect two bales on the front and two bales on the rear, for example, it may be preferred to first collect a bale on the front, then one on the rear, then one on the front and finally one on the rear. This method may be preferred to avoid placing too much weight on one end of the tractor, which can be problematic for some machines. An example of this type of path is illustrated in FIG. 45. A first path segment $P_1$ begins at the starting location and ends at a first bale 84c, and corresponds to forward movement of the bale collection machine. A second path segment $P_2$ begins at the first bale 84c and ends at a second bale 84a, and is intended for the bale collection machine to travel in the reverse direction after collecting the first bale 84c. A third path segment $P_3$ begins at the second bale 84a and ends at a third bale 84d, and is intended for the bale collection machine to travel in the forward direction. A fourth path segment $P_4$ begins at the third bale 84d and ends at a fourth bale 84b, and is intended for the bale collection machine to travel in the reverse direction. A return path $P_R$ includes a first portion 218 travelled by the machine in the reverse direction and a second portion 220 travelled by the machine in the forward direction. The bale collection path illustrated in FIG. 45 may be used by a tractor to collect the first bale 84c on a front of the tractor, collect the second bale 84a on a rear of the tractor, collect the third bale 84d on the front of the tractor, and collect the fourth bale 84b on the rear of the tractor, in that order.

Figure 46:
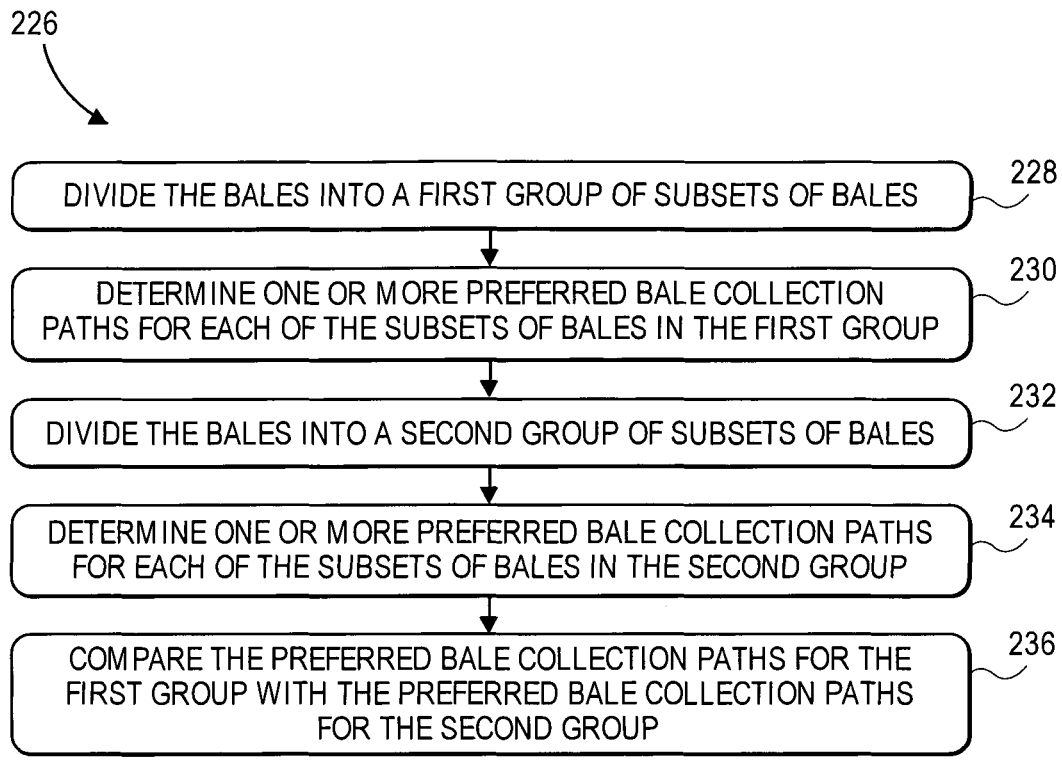
FIG. 46 is a flow diagram illustrating an exemplary method of determining a preferred bale collection plan for a large number of bales in a field.
Figure 47:
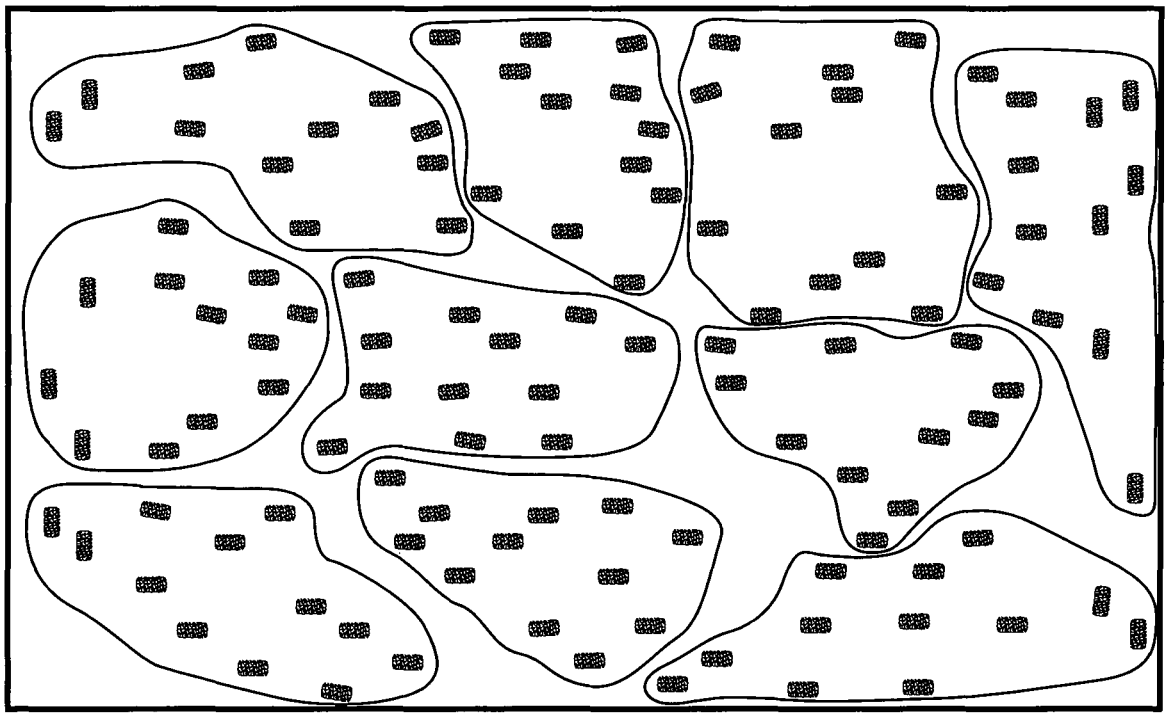
FIGS. 47-48 illustrate a plurality of bales in a field and various groupings of the bales for use in the method illustrated in FIG. 46.
Figure 48:
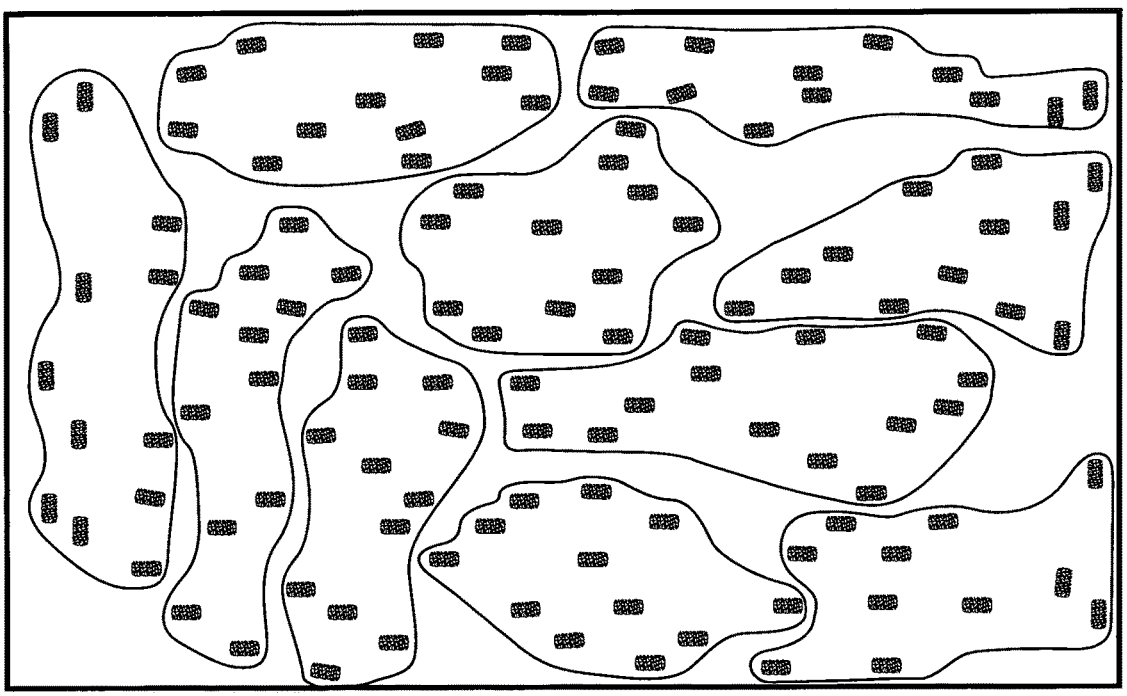

In some scenarios there may be a very large number of bales in a field to be collected, such as hundreds of bales. An exemplary field with a large number of bales is illustrated in FIG. 3. In those scenarios collecting the bales may involve using many bale collection paths and special techniques may be used to determine the preferred bale collection paths. An exemplary method is illustrated in the flow diagram 226 of FIG. 46, wherein the bales are divided into subsets and one subset is collected at a time. First, all of the bales are divided into a first group of subsets of bales, as depicted in block 228. An example of this is illustrated in FIG. 47, wherein all of the bales in the field are divided into ten groups of twelve bales each. The computing device then determines a preferred bale collection path for each of the subsets of bales in the first group, as depicted in block 230. All of the bales are then divided into a second group of subsets of bales, as depicted in block 232. FIG. 48 illustrates the bales of FIG. 47 divided into a second subset of bales different than the first subset of bales. The computing device then determines a preferred bale collection path for each of the subsets of bales in the second group, as depicted in block 234. Finally, the computing device compares the preferred bale collection paths for each group of subsets of bales with the preferred bale collection paths for each of the other groups of subsets of bales, as depicted in block 236.

Comparing the preferred bale collection paths may involve comparing a total travel distance required to collect all of the bales in a first group of subsets of bales with a total travel distance required to collect all of the bales in another group of subsets of bales. Alternatively, comparing the preferred bale collection paths may involve comparing an estimated travel time required to collect all of the bales in a first group of subsets of bales with an estimated travel time required to collect all of the bales in another group of subsets of bales. The computing device may select the group of subsets that presents the shortest overall travel distance or the shortest overall estimated travel time.

Figure 49:
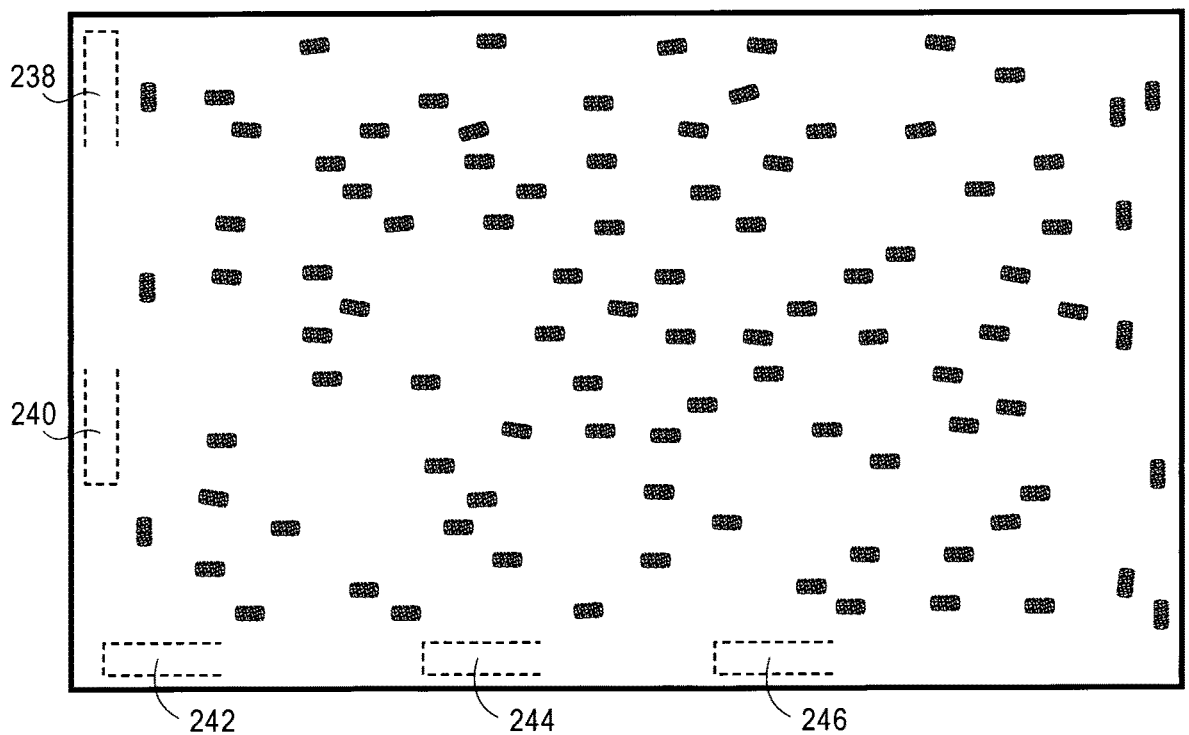
FIG. 49 illustrates a plurality of bales in a field and various suggested bale stack locations that may be used to automatically determine a preferred bale stack location.

Embodiments of the present invention involve a system and method for selecting a bale stack location. A selected bale stack location may correspond, for example, to a stack location that allows for the fastest collection of bales or the least amount of travel to collect the bales. In one embodiment, the computing device selects a preferred stacking location from a number of possible stacking locations. FIG. 49 illustrates an exemplary field of bales and a number of possible bale stack locations 238, 240, 242, 244 and 246. The possible bale stack locations may be indicated by a user and may correspond, for example, to areas of the field that are level and easily accessible. To select a preferred bale stack location the computing device may determine preferred bale collection plans for each of the possible bale stack locations using for example, the methods set forth in flow diagrams 124 and 226, compare the total travel distance or estimated total travel time associated with bale collection for each of the possible stack locations, and then select the stack location that corresponds to the bale collection plan requiring the least amount of time or travel.

Figure 50:
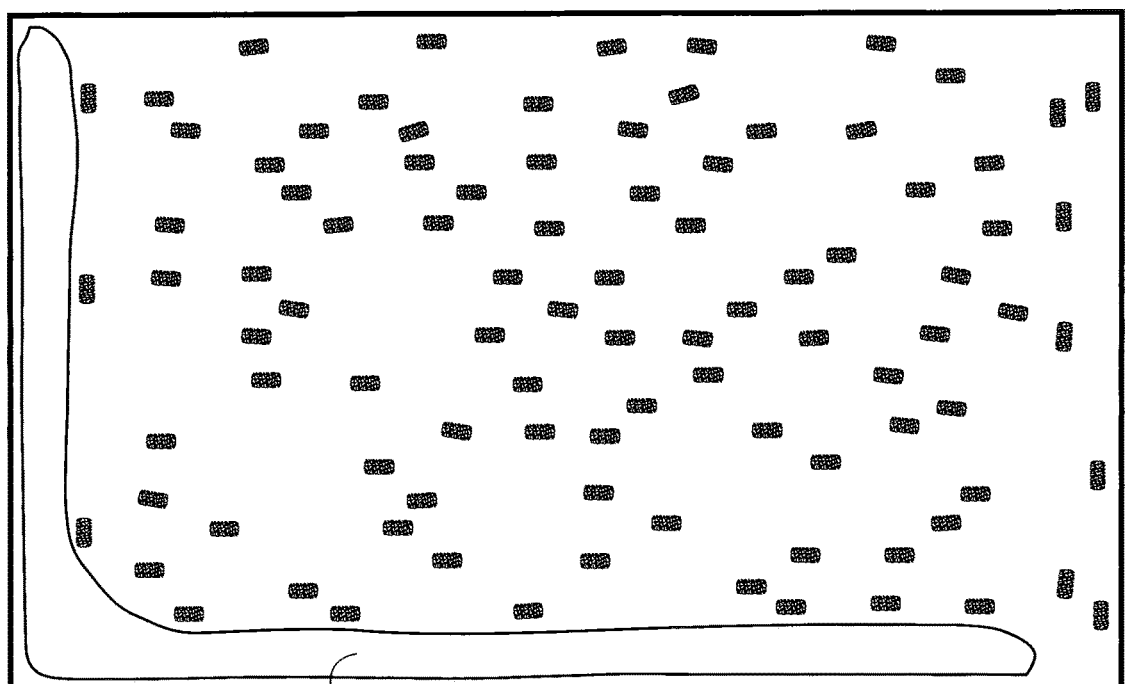
FIG. 50, illustrates a plurality of bales in a field and a suggested bale stack region that may be used to automatically determine a preferred bale stack location.

According to another embodiment the computing device identifies a preferred bale stack location in a designated region without suggested stack locations. FIG. 50 depicts the same field as depicted in FIG. 49, but instead of proposed stack locations the figure includes a designated region 248. The computing device determines a preferred bale stack location within the designated region 248 by, for example, analyzing the bale collection plan for each of a plurality of possible stack locations within the region and then selecting the stack location that corresponds to the bale collection plan requiring the least amount of time or travel. Specifically, the computing device may first analyze a bale stack location at one end of the region, then analyze a second bale stack location a distance n from the first bale stack location, then analyze a third bale stack location a distance n from the second bale stack location and so on until bale stack locations have been considered for the entire region. By way of example and not limitation, the distance n may be within the range of one meter to ten meters.

Figure 51:
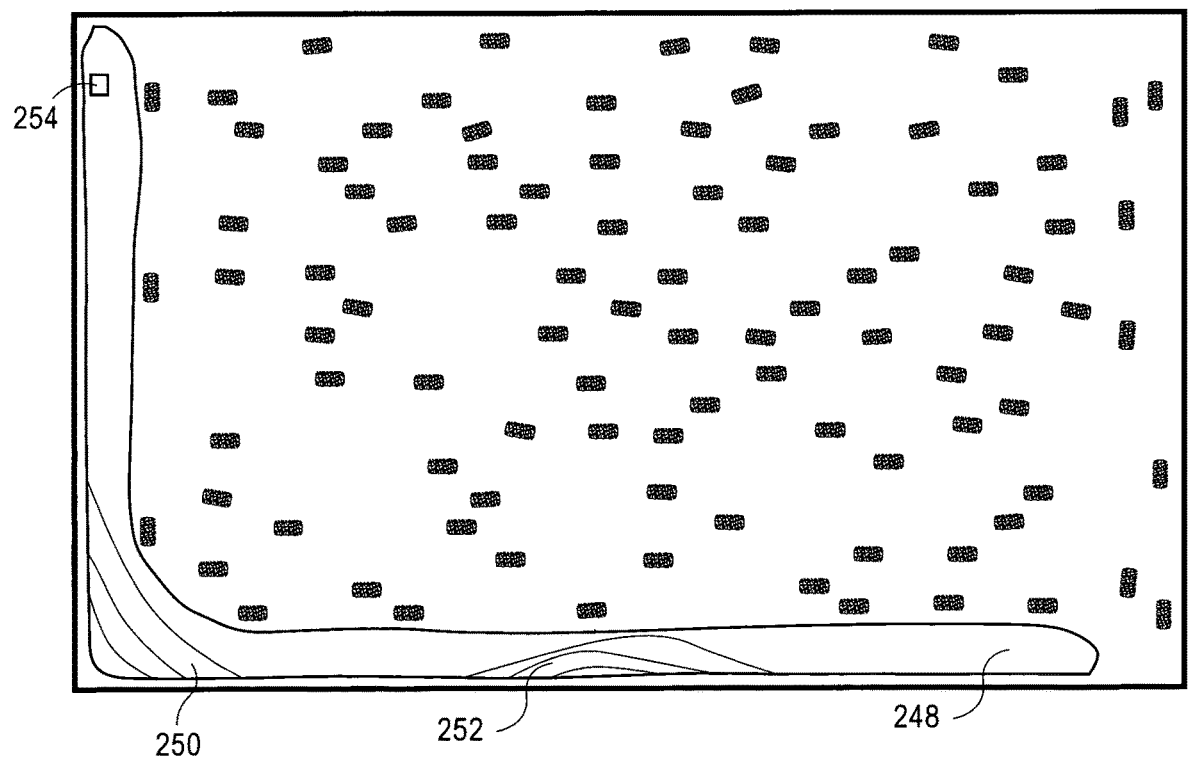
FIG. 51 is the field of FIG. 50, including various obstacles in the suggested bale stack region that limit where a bale stack may be located.

When determining a bale stack location within a region, the computing device may take into account factors such as surface terrain, obstacles and the anticipated size of the stack. FIG. 51 illustrates the same field as FIG. 50, but with surface terrain and obstacle characteristics within the designated region 248. A first portion 250 and a second portion 252 of the designated region 248 include surface grades that render them unfit for stacking bales. Another portion 254 of the designated region includes an obstacle 254, such as a building or a utility fixture, that must be avoided. When determining a preferred bale stack location, the computing device does not consider any stack locations that would correspond to any of these obstacles or that would fall within a threshold distance of any of the obstacles, such as ten meters. By way of example, the computing device may determine that, given the total number of bales in the field and the size of the bales, the final stack will be fifty meters in length and one and one-half meters in width. The computing device may use a rectangle of those dimensions to simulate the stack and determine whether a location is fit for stacking bales. If any portion of the rectangle overlaps an obstacle, or is within the threshold distance of the obstacle, the computing device rejects that stack location.

Once the computing device has determined a preferred path for collecting the bales, it may present the information to an operation of the machine to enable the operator to follow the preferred path. By way of example, the computing device may present information about the preferred path to the operator via the user interface 24, such as a depiction of the path and a current location of the machine on the path.

Alternatively or additionally, the computing device may be configured to automatically drive the bale collection machine along all or a portion of the preferred bale collection path using an automated guidance system. An automated guidance system may use the position determining device 22 to determine a position of the machine, a map of the field including the locations and orientations of the bales, and the determined bale collection path or paths. One or more computing devices, such as the controller 20 may control movement of the machine through one or more actuators to cause the machine to follow the one or more bale collection paths and to engage and collect each bale on the path as the machine encounters the bale. The machine may use a combination of sensors, such as the sensors 26, and actuators, such as the actuators 28, to engage each bale and confirm that the bale has been properly engaged and collected. Thus, this embodiment of the invention may be implemented on a bale collection machine configured for fully autonomous operation—that is, configured to operate without a human operator present. Such a machine may not have an operator cabin.

Embodiments of the present invention relate to automatically determining one or more preferred travel paths for collecting bales placed across the surface of a field. One advantage of this aspect of the invention is that it can save the producer valuable resources including time and money. The bale collection process currently involves an operator randomly collecting bales from the field without using a pattern or strategy for collecting the bales. For producers who bale and collect hundreds or thousands of bales collecting the bales can be a long and expensive process. By using aspects of the present invention to select a shortest or fastest travel path to collect the bales, operators could save hundreds of dollars in fuel and machine maintenance costs and many hours of machine operator time.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A system comprising:
   a mobile machine for collecting a plurality of bales dispersed across a ground surface; and
   one or more computing devices configured to-
      receive location and orientation information for the plurality of bales, the location and orientation information including a location and an orientation of each of the bales,
      automatically determine a preferred path for collecting the bales using the location and orientation information, and
      present information about the preferred path to an operator of the mobile machine,
      wherein automatically determining the preferred path for collecting the bales includes-
         dividing the plurality of bales into a first group of subsets of bales, the first group of subsets of bales including all of the plurality of bales,
         for each of the subsets of bales in the first group, determining a preferred path for collecting the bales,
         dividing all of the plurality of bales into a second group of subsets of bales, the second group of subsets of bales including all of the plurality of bales,
         for each of the subsets of bales in the second group, determining a preferred path for collecting the bales, and
         comparing the preferred paths determined for the first group with the preferred paths determined for the second group to determine a preferred plan for collecting all of the plurality of bales.

2. The system as set forth in claim 1, the one or more computing devices further configured to automatically determine the preferred path for collecting the bales such that the path intersects each of the bales in line with a particular bale orientation.

3. The system as set forth in claim 1, the preferred path minimizing travel distance.

4. The system as set forth in claim 1, the preferred path minimizing travel time.

5. The system as set forth in claim 1, the one or more computing devices further configured to automatically determine the preferred path using a starting location of the mobile machine and a bale stack location.

6. The system as set forth in claim 1, the one or more computing devices further configured to-
   receive ground surface information, and
   automatically determine the preferred path for collecting the bales using the location and orientation information and the ground surface information.

7. The system as set forth in claim 6,
   the ground surface information including ground surface slope, and
   the one or more computing devices configured to automatically determine the travel path such that the travel path intersects bales only on ground surface slopes that are compatible with operation of the mobile machine.

8. The system as set forth in claim 1, the one or more computing devices further configured to-
   receive geographic feature information, and
   automatically determine the preferred path for collecting the bales using the location and orientation information and the geographic feature information.

9. The system as set forth in claim 8,
   the geographic feature information including machine travel limitations, and
   the one or more computing devices configured to automatically determine the travel path such that the travel path does not violate the travel limitations.

10. The system as set forth in claim 1, the one or more computing devices further configured to automatically determine the preferred path for collecting the bales using the location and orientation information and a stacking location of the bales.

11. A method comprising:
   receiving, via one or more computing devices associated with a mobile machine for collecting a plurality of bales dispersed across a ground surface, location and orientation information for the plurality of bales, the location and orientation information including a location and an orientation of each of the bales,
   automatically determining a preferred path for collecting the bales using the location and orientation information, and
   presenting information about the preferred path to an operator of the mobile machine, wherein the step of automatically determining the preferred path for collecting the bales includes-
- dividing the plurality of bales into a first group of subsets of bales, the first group of subsets of bales including all of the plurality of bales,
- for each of the subsets of bales in the first group, determining a preferred path for collecting the bales,
- dividing all of the plurality of bales into a second group of subsets of bales, the second group of subsets of bales including all of the plurality of bales,
- for each of the subsets of bales in the second group, determining a preferred path for collecting the bales, and
- comparing the preferred paths determined for the first group with the preferred paths determined for the second group to determine a preferred plan for collecting all of the plurality of bales.

* * * * *